United States Patent
Gu et al.

(10) Patent No.: US 12,455,167 B2
(45) Date of Patent: Oct. 28, 2025

(54) PROVIDING IMPROVED, REAL-TIME TRANSPORTATION ROUTE INTERFACES UTILIZING ROUTE EFFICIENCY METRICS BASED ON NON-TEMPORAL FACTORS

(71) Applicant: Lyft, Inc., San Francisco, CA (US)

(72) Inventors: Janie Jia Gu, San Francisco, CA (US); Philip Gerstoft, San Francisco, CA (US); Guy-Baptiste Richard de Capele d'Hautpoul, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 642 days.

(21) Appl. No.: 17/397,097

(22) Filed: Aug. 9, 2021

(65) Prior Publication Data

US 2022/0307845 A1 Sep. 29, 2022

Related U.S. Application Data

(60) Provisional application No. 63/164,987, filed on Mar. 23, 2021.

(51) Int. Cl.
*G01C 21/34* (2006.01)
(52) U.S. Cl.
CPC ..... *G01C 21/3415* (2013.01); *G01C 21/3492* (2013.01)
(58) Field of Classification Search
CPC ............ G01C 21/3415; G01C 21/3492; G01C 21/3438
USPC ........................................................ 701/423
See application file for complete search history.

(56) References Cited

U.S. PATENT DOCUMENTS

| | | | | |
|---|---|---|---|---|
| 7,849,031 B2* | 12/2010 | Stehle | .................... | G06Q 10/04 706/21 |
| 8,942,918 B2* | 1/2015 | Hansen | .............. | G01C 21/3632 701/428 |
| 9,347,780 B2* | 5/2016 | Caine | ................. | G01C 21/3453 |
| 9,726,510 B2* | 8/2017 | Peri | ..................... | G01C 21/3476 |
| 10,260,898 B2* | 4/2019 | McNew | ............ | G01C 21/3492 |
| 10,880,118 B2* | 12/2020 | Stolfus | ................. | G08G 1/0133 |
| 11,821,743 B2* | 11/2023 | Balva | ................. | G06Q 30/0235 |
| 12,342,223 B2* | 6/2025 | Yeh | ........................ | H04W 48/18 |
| 2006/0235739 A1* | 10/2006 | Levis | ..................... | G06Q 10/08 705/1.1 |
| 2007/0293958 A1* | 12/2007 | Stehle | ................ | G06Q 30/0207 700/89 |

(Continued)

*Primary Examiner* — Kenny Nguyen
(74) *Attorney, Agent, or Firm* — Keller Preece PLLC

(57) ABSTRACT

The present disclosure relates to systems, non-transitory computer-readable media, and methods that improve efficiency and flexibility of implementing computer devices by providing efficient user interfaces to provider devices that include optimal digital routes selected based on dynamic route efficiency metrics. In particular, the disclosed systems can identify and surface an optimal alternative route from a pickup location to a drop-off location associated with a transportation match based on a variety of dynamic non-temporal factors. The disclosed systems can utilize a variety of computer implemented models to determine non-temporal factors, such as distance efficiency metrics, route-segment access efficiency metrics, congestion efficiency metrics, risk efficiency metrics, and match-based efficiency metrics. The disclosed systems can then combine these non-temporal factors utilizing a common efficiency framework to determine and surface an optimal alternative route.

20 Claims, 15 Drawing Sheets

(56) References Cited

U.S. PATENT DOCUMENTS

| | | | | |
|---|---|---|---|---|
| 2010/0312466 A1* | 12/2010 | Katzer | ............. | G08G 1/096827 |
| | | | | 701/533 |
| 2010/0324817 A1* | 12/2010 | Hansen | .............. | G01C 21/3632 |
| | | | | 701/414 |
| 2015/0226563 A1* | 8/2015 | Cox | ................... | G01C 21/3469 |
| | | | | 701/29.1 |
| 2016/0003631 A1* | 1/2016 | Sund | ...................... | G01C 21/34 |
| | | | | 701/119 |
| 2017/0314945 A1* | 11/2017 | König | ................ | G01C 21/3461 |
| 2018/0017398 A1* | 1/2018 | Mcnew | .............. | G01C 21/3453 |
| 2018/0209801 A1* | 7/2018 | Stentz | ................. | G05D 1/0274 |
| 2018/0309592 A1* | 10/2018 | Stolfus | ................ | G08G 1/0141 |
| 2020/0200552 A1* | 6/2020 | Sood | ................. | G01C 21/3415 |
| 2021/0140777 A1* | 5/2021 | Balva | ................. | G01C 21/3484 |

* cited by examiner

PROVIDING IMPROVED, REAL-TIME TRANSPORTATION ROUTE INTERFACES UTILIZING ROUTE EFFICIENCY METRICS BASED ON NON-TEMPORAL FACTORS

CROSS-REFERENCE TO RELATED APPLICATIONS

This application claims priority to and the benefit of U.S. Provisional Patent Application No. 63/164,987, filed Mar. 23, 2021, which is incorporated herein by reference in its entirety.

BACKGROUND

Recent years have seen significant development in transportation systems that utilize web and mobile applications to match provider devices to real-time on-demand transportation requests from requestor devices. For example, on-demand transportation systems can match provider devices with requestor devices to provide transportation services for thousands of requestor devices distributed across a wide geographical area. Although transportation systems can match multiple requestors with providers, such systems suffer from a number of technical problems, particularly in efficiency and flexibility of implementing computer systems.

BRIEF SUMMARY

Embodiments of the present disclosure provide benefits and/or solve one or more of the foregoing or other problems in the art with systems, non-transitory computer-readable media, and methods that improve efficiency and flexibility of implementing computer devices by providing efficient user interfaces to provider devices that include optimal digital routes selected or ranked based on dynamic route efficiency metrics. For example, in response to generating a transportation match between a requestor device and a provider device, the disclosed systems can identify a fastest route between locations corresponding to the transportation match (e.g., between a pick-up location and a drop-off location). However, as described in greater detail below, providing user interfaces illustrating a fastest route (based on temporal factors) often results in a variety of inefficiencies for implementing computing device (e.g., excessive user interfaces and user interactions as provider devices identify competing factors and additional computational/bandwidth demand in adjusting digital matches and routes).

Accordingly, the disclosed systems can utilize route efficiency metrics to generate more efficient user interfaces that display optimal alternative routes. In particular, the disclosed systems can dynamically determine and combine temporal and real-time non-temporal factors to generate route efficiency metrics for alternative routes. For example, the disclosed systems can utilize computer-implemented models to generate distance efficiency metrics, route-segment access efficiency metrics, congestion efficiency metrics, risk efficiency metrics, and match-based efficiency metrics. The disclosed systems can combine these various non-temporal factors together with temporal factors utilizing a common efficiency framework to generate an overall route efficiency metric for each alternative route.

Moreover, by comparing these route efficiency metrics, the disclosed systems can provide user interfaces with optimized routes that improve efficiency and flexibility of implementing systems. For example, utilizing this approach the disclosed systems can reduce inefficient user interactions and user interfaces. Moreover, the disclosed systems can improve flexibility in selecting and providing routes via provider device interfaces. In addition, the disclosed systems can reduce computational/bandwidth demand in generating additional digital matches and routes resulting from inefficiencies of conventional systems.

BRIEF DESCRIPTION OF THE DRAWINGS

The detailed description refers to the drawings briefly described below.

DETAILED DESCRIPTION

Figure 1:
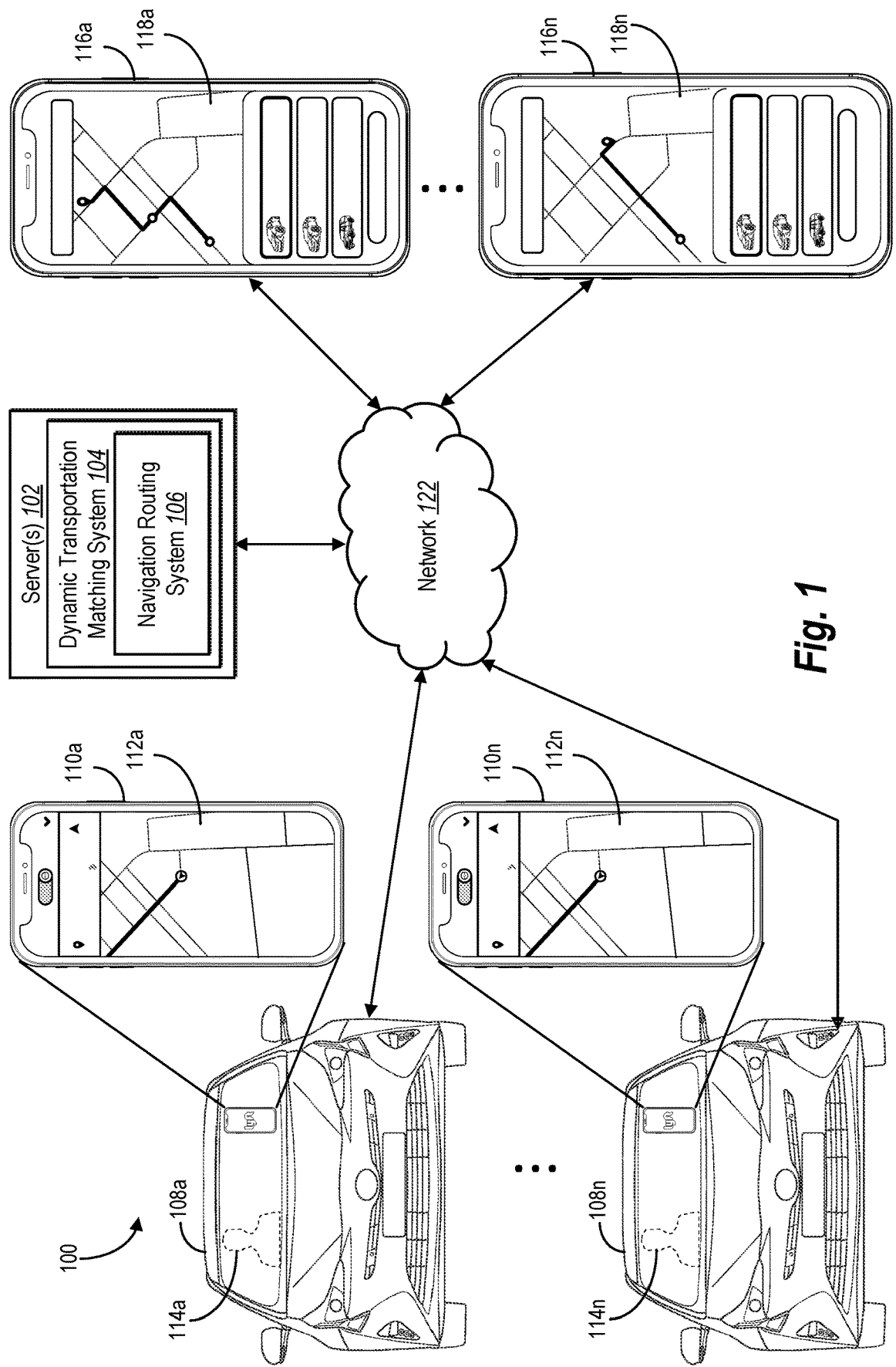
FIG. 1 illustrates an example environment in which a dynamic transportation matching system and a navigation routing system operate in accordance with one or more embodiments.

This disclosure describes one or more embodiments of a navigation routing system that improves efficiency and flexibility of transportation matching systems by providing improved provider device user interfaces that include optimal digital routes selected based on dynamic route efficiency metrics. For example, in response to detecting a transportation match, the navigation routing system can (i) identify the fastest route from the pickup location to the drop-off location specified by the transportation match, and then (ii) determine and rank optimal alternative routes to the fastest route based on route efficiency metrics determined utilizing temporal and non-temporal factors. To illustrate, the navigation routing system can analyze historical and real-time digital data to generate distance efficiency metrics, route-segment access efficiency metrics, congestion efficiency metrics, risk efficiency metrics, and/or match-based efficiency metrics for a variety of alternative routes. The navigation routing system can combine these non-temporal factors (and one or more temporal factors) utilizing a common efficiency framework to determine overall route efficiency metrics. The navigation routing system can then compare the route efficiency metrics to surface a user interface that provides one or more optimal navigation routes to a provider device. In this manner, the navigation routing system can improve efficiency and flexibility while avoiding inefficient user interfaces and wasted resources of conventional systems.

In more detail, and as mentioned above, the navigation routing system can identify a transportation match between a provider device and a requestor device. In response, the navigation routing system can identify multiple routes between locations corresponding to the transportation match. For example, the navigation routing system can identify a fastest route from the pickup location to the drop-off location. In one or more embodiments, the navigation routing system identifies the fastest route by identifying the route that will cause the transportation vehicle to arrive at the drop-off location in the shortest amount of time.

The navigation routing system can also identify and rank alternative routes in addition to the fastest route. For example, there are often multiple routes between locations corresponding to a transportation match. Accordingly, the navigation routing system can identify all alternative routes, a threshold number of alternative routes, or a threshold percentage of total alternative routes. For instance, the navigation routing system can identify five alternative routes. In another embodiment, the navigation route system can identify all alternative routes that add no more than a threshold distance to the distance of the fastest route.

In one or more embodiments, the navigation routing system further narrows the number of alternative routes by identifying a subset of the ranked alternative routes that are within a travel-time threshold of the fastest route. For example, the navigation routing system identifies those alternative routes that extend the travel time associated with the fastest route by no more than a threshold amount. For example, the navigation routing system can determine a travel time for the fastest route, and travel times for each of the identified of alternative routes. The navigation routing system can then determine the subset of alternative routes with travel times that are within a travel-time threshold of the travel time of the fastest route (e.g., within two minutes of the fastest route's travel time, within 120% of the fastest route's travel time).

With the subset of alternative routes, the navigation routing system can further identify an alternative route that is optimized based on a route efficiency metric that reflects a variety of non-temporal factors. For example, the navigation routing system can analyze each of the subset of alternative routes based on one or more of distance-based factors, route-based factors, and match-based factors. The navigation routing system can convert these factors to a common efficiency framework and combine them to determine a route efficiency metric. Moreover, the navigation routing system can compare route efficiency metrics across different routes to identify an optimal alternative route to provide via a user interface of a provider device.

For example, the navigation routing system can generate distance efficiency metrics for alternative routes. To illustrate, the navigation routing system can determine an overall distance corresponding to each alternative route and apply an efficiency weight to each distance. The navigation routing system can determine the distance efficiency weight based on a variety of distance-based factors that reflect efficiency losses for each mile traversed by a particular provider device. Indeed, in some embodiments, the navigation routing system can determine this distance efficiency weight unique to each provider device. The navigation routing system can combine the distance efficiency weight with the distance for each alternative route to determine a distance efficiency metric for each alternative route.

As mentioned above, the navigation routing system can also determine route-based factors associated with each of the subset of alternative routes. For example, the navigation routing system can determine route-segment access efficiency metrics (reflecting efficiency losses/penalties associated with accessing particular road segments, such as toll roads). Similarly, the navigation routing system can determine congestion efficiency metrics that reflect efficiency losses/gains corresponding to different levels or regions of congestion. Moreover, in some embodiments, the navigation routing system can determine risk efficiency metrics that reflect a risk of provider vehicle interruption events (e.g., damage or incidents that will cause efficiency losses).

As discussed, the navigation routing system can also determine match-based factors associated with alternative routes to determine a match-based efficiency metric. For example, the navigation routing system can determine a match-based efficiency metric that reflects a likelihood of identifying a transportation match along an alternative route (e.g., to create a shared transportation request). In one or more embodiments, the navigation routing system utilizes a computer-implemented model to analyze historical transportation matching patterns for particular regions and/or road segments to determine transportation match predictions. The navigation routing system can convert these match predictions to a match-based efficiency metric for alternative routes. Moreover, the navigation routing system can generate match-based efficiency metrics that reflect ride transportation matches (e.g., transportation matches between a requestor device and a provider device) and/or delivery transportation matches (e.g., transportation matches between a provider devices and a delivery parcel or package). Thus, the navigation routing system can determine a match-transportation metric for an alternative route that reflects historical shared transportation activity along the alternative route, ease of stopping or pulling over along the alternative route, large events occurring along the alternative route, package delivery hubs along an alternative route, and/or city centers located along the alternative route.

As mentioned above, the navigation routing system can combine various non-temporal factors to generate route efficiency metrics. Indeed, in one or more embodiments, the navigation routing system models these various non-temporal factors as part of an objective function that treats the various non-temporal factors as cost components to improve in selecting an optimal alternative route. Accordingly, the navigation routing system can optimize the route efficiency metrics to identify one or more alternative routes to provide via a user interface of a provider device in connection with a transportation match. The navigation routing system can then cause the provider client device associated with the current transportation match to display navigation instructions associated with the identified alternative route(s).

As mentioned above, conventional systems suffer from a variety of drawbacks in relation to efficiency and flexibility of implementing computing devices. To illustrate, conventional systems typically provide digital routes to provider devices based solely on a single, rigid temporal consideration (e.g., the fastest route). This inflexible approach leads to a variety of inefficiencies. Of course, as an initial matter, this approach leads to a variety of increased vehicle and resource costs. However, this approach also leads provider devices to resort to inefficient use of alternative applications and user interfaces (through a variety of different user interactions) to make routing decisions. For example, provider devices will often switch to other applications and/or user interfaces to identify factors that are not reflected by a temporal, fastest-route analysis. To provide but one example, provider devices will often access a different application to identify tolls and toll roads along a route. Similarly, provider devices will often access additional user interfaces to identify information regarding congestion or information regarding alternative fares/matches. Accordingly, conventional systems often lead to increased user interactions, inefficient utilization of user interfaces, and increased use of computing resources.

In addition, conventional systems often waste computing resources in generating additional routes and additional matches. To illustrate, using a rigid, fastest route approach can lead providers to ignore or deviate from a given route. For example, a provider device provided with a fastest route that includes a toll road will often deviate from the fastest route (or cancel a transportation match) to avoid the toll. This increases processing resources utilized to generate an additional route and/or generate a new transportation match between a provider device and requestor device. Moreover, systems that utilize a fastest route will often utilize inordinate amounts of processing power, system memory, and other network resources in receiving, matching, and routing transportation requests between requestors and providers on an individual basis. Indeed, selecting the fastest routes often leads to systems utilizing processing resources to generate overlapping transportation matches and routes in servicing provider devices in similar regions (that could be matched to the same provider device along a single route).

The navigation routing system can improve efficiency and flexibility relative to these conventional systems. For example, rather than utilizing rigid temporal-based computational models, the navigation routing system efficiently analyzes a variety of non-temporal factors in connection with multiple alternative routes to identify and rank one or more optimal alternative routes and provide the optimal alternative routes via a provider device user interface. In contrast to conventional systems, the navigation routing system not only reduces vehicle and system costs, but can reduce user interactions and processing power devoted to accessing alternative applications and user interfaces. For example, the navigation routing system can utilize distance efficiency metrics, access efficiency metrics, congestion efficiency metrics, risk efficiency metrics, and match-based efficiency metrics in selecting an optimal route and generating a navigation user interface. Thus, the navigation routing system can alleviate the need for accessing alternative interfaces, applications, and websites (e.g., toll road websites, congestion applications, rate or fare interfaces). Rather, the navigation routing system can generate a user interface with an optimal alternative route that flexibly reflects temporal and non-temporal factors without any additional user interactions, applications, or interfaces.

In addition, the navigation routing system can also improve efficiency by reducing duplicative generation of routes and transportation matches. For example, by considering non-temporal factors, the navigation routing system can reduce processing power required to generate new routes and/or new transportation matches resulting from inefficient routes (e.g., route deviation to avoid inefficiencies and/or transportation match cancellations). To illustrate, in utilizing access efficiency metrics, the navigation routing system can generate routes that exclude tolls unless the toll readily improves overall efficiency (not simply time). Similarly, in utilizing match-based efficiency metrics, the navigation routing system can utilize a single provider device to respond to multiple provider requests. Thus, the navigation routing system can reduce processing resources in matching and navigating multiple provider devices to these requestor devices.

As illustrated by the foregoing discussion, the present disclosure utilizes a variety of terms to describe features and advantages of the navigation routing system. For example, as used herein, a "transportation match" (or "match") refers to a transportation request that a transportation system has assigned to a particular provider. In particular, the transportation system generates a match that assigns a provider to a transportation request that includes a requestor/delivery package a pickup location, and a drop-off location. In at least one embodiment, and in response to the provider accepting the match, the transportation system can provide a route to the provider client device that includes navigation instructions from the current location of the provider client device to the pickup location specified by the transportation match.

As suggested above, the term "transportation provider" (or "provider") refers to a driver or other person who operates a transportation vehicle and/or who interacts with a provider client device, on the one hand, or an autonomous vehicle, on the other hand. For instance, a transportation provider includes a person who drives a transportation vehicle along various transportation routes—or an autonomous vehicle that drives along such transportation routes—to pick up and drop off requestors.

As suggested above, the term "transportation requestor" (or "requestor") refers to a person who submits (or is projected to submit) a transportation request to a dynamic transportation matching system and/or who interacts with a requestor client device. For instance, a transportation requestor includes a person who interacts with a requestor client device to send a transportation request to a dynamic transportation matching system. After the dynamic transportation matching system matches a requestor with a provider, the requestor can await pickup by the provider at a predetermined pickup location. Upon arrival of the provider, the requestor can engage with the provider by getting into a transportation vehicle associated with the provider for transport to a drop-off location specified in the requestor's transportation request. Accordingly, a requestor may refer to (i) a person who requests a ride or other form of transportation but who is still waiting for pickup or (ii) a person whom a transportation vehicle has picked up and who is currently riding within the transportation vehicle to a destination.

As used herein, the term "route" refers to a path of travel to or from a location, such as from a first location to second location. For example, a route can refer to a predefined path from a provider's current location to a pickup location of a requestor and/or from the pickup location to a drop-off location. As described below, routes can include an initial or a projected transportation route (e.g., an estimated route for transporting one or more requestors), an adjusted route (e.g., a route different than or modified from an initial route), etc. In at least one embodiment, the navigation routing system identifies a route by ranking existing routes based on one or more of the metrics discussed herein.

As further suggested above, in some embodiments, a route is associated with a travel time. As used herein, the term "travel time" refers to an amount of time for a vehicle or requestor to travel from one location to another location, including or excluding waypoints. For example, in some cases, the travel time associated with an active transportation along a route refers to an amount of time for the transportation vehicle to move from a current location on the route to a destination (e.g., the drop-off location).

As used herein, the term "route efficiency metric" refers to a standardized measure of efficiency associated with a route. For example, the route efficiency metric associated with a route reflects a variety of non-temporal factors associated with the route that have been converted to a common efficiency framework, and as such are comparable. The route efficiency metric can reflect all or a subset of non-temporal factors, where the non-temporal factors are reflected by the route efficiency metric in any combination. The route efficiency metric can include a variety of different measures of efficiency. For example, the route efficiency metric can reflect a common cost measure (for purposes of a cost function/objective function) a measure of computer resources or another measure of efficiency.

As used herein, the term "temporal factor" refers to any time-based factor associated with a route. For example, a temporal factor associated with a route can include an amount of travel time associated with the route. To illustrate, temporal factors associated with a route can include a predicted travel time to travel the entire route based on the distance of the route and known speed limits along the route. The travel time can also be determined based on historical travel data associated with the route (e.g., an average travel time based on other providers who have traveled the same route), and/or current route conditions (e.g., current traffic, current weather, current events that may impact traffic along the route).

As used herein, the term "non-temporal factor" refers to any non-time-based factor associated with a route. For example, non-temporal factors associated with a route can include, but are not limited to factors associated with the route's distance, factors associated with access efficiency along the route, factors associated with risks along the route, factors associated with congestion along the route, factors associated with shared transportation along the route, and factors associated with package deliveries along the route.

As used herein, the term "optimal alternative route" refers to an optimized alternative route from a subset of routes that are alternative to a fastest route between two locations. For example, optimal alternative routes can include alternative routes associated with a minimized (or threshold) route efficiency metric. In at least one embodiment, the optimal alternative route is an alternative route between two locations that is associated with a lowest cost (or a lowest number of routes) as reflected by a route efficiency metric.

As used herein, the term "efficiency weight" refers to a weight for converting one or more factors to a metric within a common efficiency framework. For example, a "time efficiency weight" converts a travel time associated with a route to a time efficiency metric (e.g., provider cost for a provider during the travel time). Additionally, a "distance efficiency weight" converts distance factors associated with a route to a distance efficiency metric (e.g., a cost associated with the distance of the route). Similarly, a "congestion efficiency weight" converts congestion factors associated with a route to a congestion efficiency metric (e.g., a cost associated with congestion along the route), while a "risk efficiency weight" converts risk factors associated with the route to a risk efficiency metric (e.g., a cost associated with the risks of the route), and a "match efficiency weight" converts match-based factors to a match-based efficiency metric (e.g., costs associated shared transportation and/or delivery transportation matches along the route).

As used herein, the term "distance efficiency metric" refers to a measure of efficiency loss associated with the distance of a route. For example, a distance efficiency metric can reflect one or more distance factors multiplied by a distance efficiency weight that converts the distance factors to the common efficiency framework. In at least one embodiment, the distance efficiency metric reflects the distance of the route multiplied by a provider cost per unit of distance (e.g., the provider rate).

As used herein, the term "route-segment access efficiency metric" refers to a measure of efficiency loss associated with accessing one or more segments accessed along a route. For example, a route-segment access efficiency metric can reflect one or more efficiency losses associated with accessing route segments multiplied by a route-segment access efficiency weight that converts the efficiency losses to the common efficiency framework. For example, in at least one embodiment, the route-segment access efficiency metric reflects a cost of one or more toll segments along the route. As used herein, the term "route segment" refers to a portion of a route. For example, route segments may be indicated by streets, neighborhoods, zip codes, geohashes, and/or toll roads.

As used herein, the term "measure of congestion" refers to a congestion factor associated with a route. For example, a measure of congestion can include an amount of vehicular traffic associated with the route. Additionally or alternatively, a measure of congestion can include an indication of an area likely to include vehicular congestion along the route (e.g., a city center, a freeway interchange). Additionally or alternatively, a measure of congestion can include non-permanent indications of areas likely to include vehicular congestion along the route (e.g., a parade route on a holiday, a street festival that blocks off a road).

As used herein, the term "congestion efficiency metric" refers to a measure of efficiency loss associated with congestion data in connection with a route. For example, a congestion efficiency metric can reflect one or more efficiency losses associated with one or more measures of congestion multiplied by a congestion efficiency weight that converts the efficiency losses to the common efficiency framework. In at least one embodiment, the congestion efficiency metric reflects a cost of one or more areas of congestion along the route.

As used herein, the term "navigational maneuvers" refer to navigational features associated with a route. For example, a route can include navigational maneuvers including, but not limited to right-hand turns, left-hand turns, varying speed zones, banks, freeway entrance and exit ramps, and one-way roads.

As used herein, the term "risk efficiency measure" refers to efficiency losses associated with the navigational maneuvers and/or segments along a route. For example, a risk efficiency measure can reflect risk associated with a navigational maneuver along a route. As used herein, the term "risk efficiency map" refers to a collection of risk efficiency measures associated with a region, segment, or other zone through which the route passes. For example, a risk efficiency map can reflect historical risk efficiency measures associated with navigational maneuvers in the region, segment, or other zone through which the route passes. In one or more embodiments, the risk efficiency map informs the determination of risk efficiency measures associated with the route.

As used herein, a "risk efficiency metric" refers to a measure of efficiency loss associated with one or more risks associated with a route. For example, a risk efficiency metric can reflect a combination of risk efficiency losses associated with navigational maneuvers along a route. In at least one embodiment, the risk efficiency metric reflects an insurance cost of a particular provider providing transportation along a given route.

As used herein, the term "match-based efficiency metric" refers to a measure of efficiency loss associated with one or more match-based factors associated with a route. For example, a match-based efficiency metric can reflect one or more efficiency losses or gains associated with one or more match-based factors multiplied by a match weight that converts the efficiency losses to the common efficiency framework. In at least one embodiment, the match-based efficiency metric reflects costs or gains associated with a shared transportation matches and/or delivery transportation matches along a given route.

As used herein, the term "transportation match prediction" refers to a likelihood of a shared transportation match associated with a particular route. In one or more embodiment, a shared transportation match differs from a transportation match in that a shared transportation match is between a second requestor and an ongoing transportation of a first requestor by a provider, while a transportation match is between the first requestor and the provider. As used herein, the term "delivery transportation match" refers to a transportation match between ongoing transportation of a first requestor and pickup or drop off of a package along the same route.

Turning now to the figures, FIG. 1 illustrates a schematic diagram of an environment 100 for implementing a navigation routing system 106 in accordance with one or more embodiments. As shown in FIG. 1, the environment 100 includes server(s) 102 comprising a dynamic transportation matching system 104 and the navigation routing system 106, transportation vehicles 108a-108n, provider client devices 110a-110n respectively corresponding to the transportation vehicles 108a-108n, requestor client devices 116a-116n (respectively corresponding to individual requestors), and a network 122. In some embodiments, the transportation vehicle 108 optionally includes providers respectively corresponding to the transportation vehicles 108a-108n and provider client devices 110a-110n.

As shown, in one or more embodiments, the navigation routing system 106 can be a component of the dynamic transportation matching system 104 implemented on one or more of the server(s) 102. In these or other embodiments, the navigation routing system 106 may perform one or more acts of the present disclosure described in conjunction with the dynamic transportation matching system 104. Additionally, or alternatively, the dynamic transportation matching system 104 may perform one or more acts of the present disclosure described in conjunction with the navigation routing system 106. Furthermore, although FIG. 1 depicts the navigation routing system 106 and the dynamic transportation matching system 104 as distinct systems, the navigation routing system 106 can be implemented in whole or in part by the dynamic transportation matching system 104, and vice-versa.

As indicated by FIG. 1, the dynamic transportation matching system 104 uses the server(s) 102 to communicate with the provider client devices 110a-110n and the requestor client devices 116a-116n via the network 122. For example, the dynamic transportation matching system 104 communicates with the provider client devices 110a-110n and the requestor client devices 116a-116n via the network 122 to determine locations of the provider client devices 110a-110n and the requestor client devices 116a-116n, respectively. Per device settings, for instance, the dynamic transportation matching system 104 may receive location coordinates from the provider client devices 110a-110n and/or the requestor client devices 116a-116n, respectively. For example, the navigation routing system 106 can detect that a provider client device (e.g., the provider client device 110a) is near or has arrived at a pickup location associated with a transportation request that has been matched to the provider client device based on one or more of GPS information associated with the provider client device, WIFI information associated with the provider client device, Near-Field Communication (NFC) information associated with the provider client device, or a communication from the provider client device indicating the current location of the provider client device. Based on the location coordinates and other considerations, the dynamic transportation matching system 104 matches or assigns the transportation vehicle 108a with one or more of the requestors 120a-120n for transportation.

As suggested above, each of the provider client devices 110a-110n and the requestor client devices 116a-116n may comprise a mobile device, such as a laptop, smartphone, or tablet associated with a requestor or a provider. The provider client devices 110a-110n and the requestor client devices 116a-116n may be any type of computing device as further explained below with reference to FIG. 12. In some embodiments, the provider client devices 110a-110n are not associated with providers, but are attached to (or integrated within) the transportation vehicle 108.

As further indicated by FIG. 1, the provider client devices 110a-110n includes provider applications 112a-112n, respectively. Similarly, the requestor client devices 116a-116n include requestor applications 118a-118n, respectively. In some embodiments, the provider applications 112a-112n (or the requestor applications 118a-118n) comprise web browsers, applets, or other software applications (e.g., native applications) respectively available to the provider client devices 110a-110n or the requestor client devices 116a-116n. Additionally, in some instances, the dynamic transportation matching system 104 provides data including instructions that, when executed by the provider client devices 110a-110n or by the requestor client devices 116a-116n, respectively create or otherwise integrate one of the provider applications 112a-112n or the requestor applications 118a-118n with an application or webpage.

As further depicted in FIG. 1, the dynamic transportation matching system 104 sends route guidance and/or other notifications to the provider client devices 110a-110n within the transportation vehicles 108a-108n, respectively. While FIG. 1 depicts the transportation vehicles 108a-108n as automobiles, a transportation vehicle may also be an airplane, bicycle, motorcycle, scooter, or other vehicle. In some cases, this disclosure describes a transportation vehicle as performing certain functions, but such a transportation vehicle includes an associated provider client device that often performs a corresponding function. For example, when the dynamic transportation matching system 104 sends a transportation match to the transportation vehicle 108a—or queries location information from the transportation vehicle 108a—the dynamic transportation matching system 104 sends the transportation match or location query to the provider client device 110a. Accordingly, the transportation vehicle 108a and the provider client device 110a are part of a vehicle subsystem.

Although not illustrated in FIG. 1, in some embodiments, the environment 100 may have a different arrangement of components and/or may have a different number or set of components altogether. In certain implementations, for instance, the transportation vehicles 108a-108n do not include a human provider, but constitutes autonomous transportation vehicles—that is, self-driving vehicles that include computer components and accompanying sensors for driving without manual-provider input from a human operator. As a further example, in some embodiments, the transportation vehicles 108a-108n include hybrid self-driving vehicles with both self-driving functionality and some human operator interaction.

When a transportation vehicle is an autonomous vehicle or a hybrid self-driving vehicle, the transportation vehicle may include additional components not depicted in FIG. 1. Such components may include location components, one or more sensors by which the autonomous vehicle navigates, and/or other components necessary to navigate without a provider (or with minimal interactions with a provider). Regardless of whether a transportation vehicle is associated with a provider, a transportation vehicle optionally includes a locator device, such as a GPS device, that determines the location of the transportation vehicle within one or more of the transportation vehicles 108a-108n.

As mentioned above, the transportation vehicles 108a-108n, respectively include the provider client devices 110a-110n as separate from or integral to the transportation vehicles 108a-108n, respectively. Additionally, or alternatively, the provider client devices 110a-110n may be subcomponents of a vehicle computing system. Regardless of its form, the provider client devices 110a-110n may include various sensors, such as a GPS locator, an inertial measurement unit, an accelerometer, a gyroscope, a magnetometer, and/or other sensors, from which the dynamic transportation matching system 104 can access information, such as location information.

In some embodiments, the dynamic transportation matching system 104 communicates with the provider client devices 110a-110n through the provider applications 112a-112n. For instance, the provider applications 112a-112n can cause the provider client devices 110a-110n, respectively to communicate with the dynamic transportation matching system 104 to navigate to a pickup location to pick up a requestor; navigate to a pickup location to pick up a shared requestor; navigate to a drop-off location; identify a change in drop-off location, route, or waypoint; and/or collect fares. In some cases, the provider applications 112a-112n causes the provider client devices 110a-110n to communicate with the dynamic transportation matching system 104 to receive and present an altered or adjusted route to include pickup and drop-off locations of a new requestor, as described further below.

Figure 2:
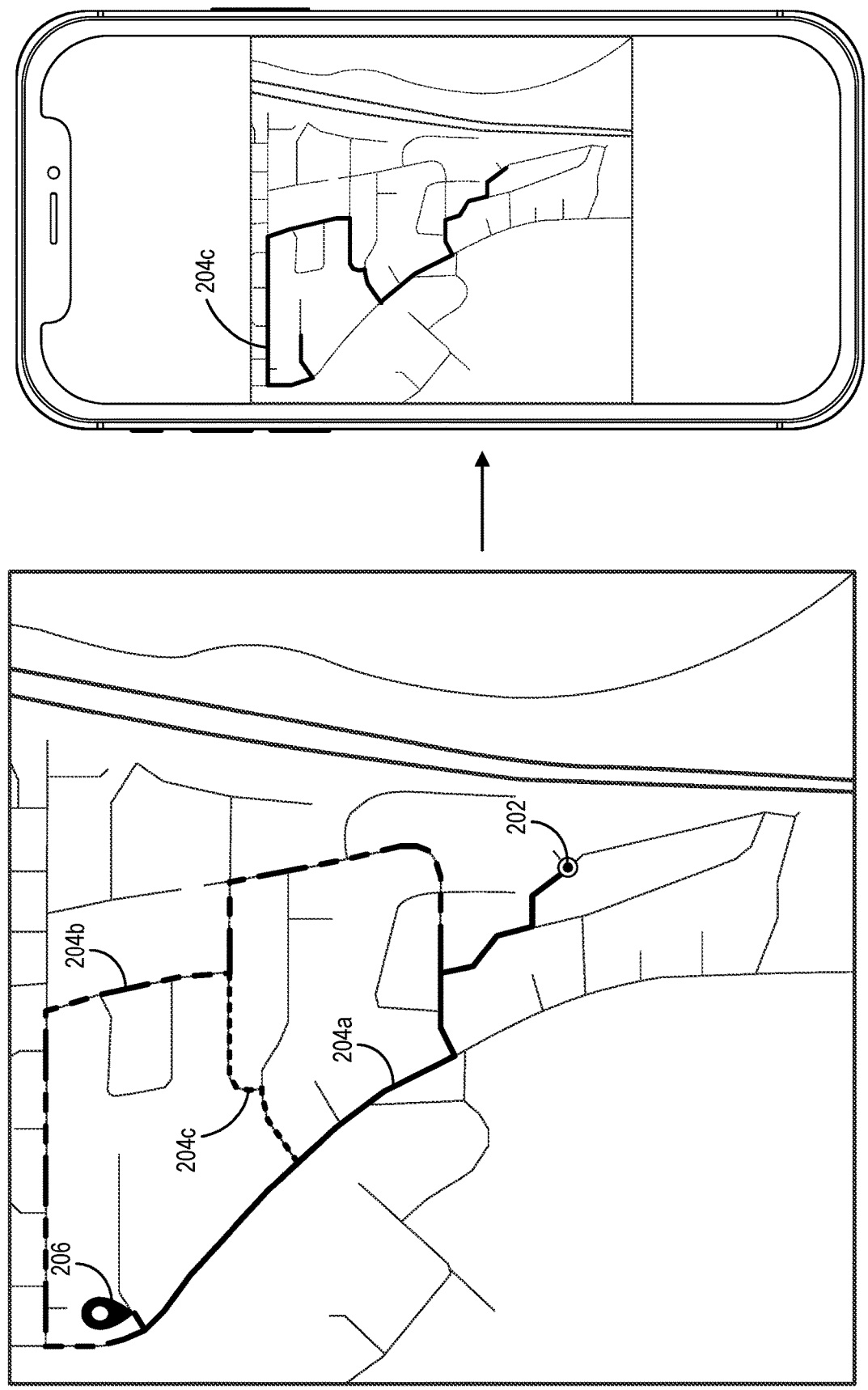
FIG. 2 illustrates an overview of the navigation routing system determining or ranking a fastest route and one or more alternative routes from a first location to a second location associated with a transportation match in accordance with one or more embodiments.

FIG. 2 illustrates an overview of the navigation routing system 106 determining and providing navigation instructions associated with routes that are alternative to a fastest route. For example, as shown in FIG. 2, the navigation routing system 106 can determine that a provider client device (e.g., the provider client device 110a) is matched to a transportation request associated with a requestor (e.g., the requestor 120a) and a pickup location 202. The navigation routing system 106 can further detect that the provider client device is approaching or arrived at either the pickup location 202 or the current location of the requestor client device associated with the matched requestor (e.g., if the requestor client device is near the pickup location 202).

In response to detecting that the provider client device is at or near the pickup location 202 (and/or that the provider client device has been matched to the requestor client device), the navigation routing system 106 can determine one or more routes from the pickup location 202 associated with the transportation match and a drop-off location 206 associated with the transportation match. For example, the navigation routing system 106 can determine a fastest route 204a from the pickup location 202 to the drop-off location 206.

Additionally, the navigation routing system 106 can analyze other factors in identifying the fastest route 204a. For example, the navigation routing system 106 can analyze traffic patterns, weather conditions, road construction, etc. in order to determine the fastest route 204a. In one or more embodiments, the navigation routing system 106 may perform the analysis required to determine the fastest route 204a. Additionally or alternatively, the navigation routing system 106 may utilize one or more third-party systems in determining the fastest route 204a.

The navigation routing system 106 can further identify one or more alternative routes 204b, 204c from the pickup location 202 to the drop-off location 206. For example, the navigation routing system 106 can identify a threshold number of routes from the pickup location 202 to the drop-off location 206 that are within a travel-time threshold of the fastest route 204a. Put another way, the navigation routing system 106 may identify ten additional routes from the pickup location 202 to the drop-off location 206, but may disregard all but the alternative routes 204b and 204c because those are the only alternative routes that are within the travel-time threshold (e.g., 2 minutes) of the travel-time associated with the fastest route 204a.

After identifying the alternative routes 204b, 204c, the navigation routing system 106 can apply one or more non-temporal models to the alternative routes 204b, 204c to identify one or more alternative routes that are optimized based on non-temporal factors (e.g., an optimal alternative route). More specifically, in at least one embodiment, the navigation routing system 106 identifies the one or more alternative routes by ranking the alternative routes 204b, 204c based on the analysis of the non-temporal factors. For example, and as will be discussed in greater detail below, the navigation routing system 106 can apply various models, algorithms, rules, and heuristics to the alternative routes 204b, 204c to determine route efficiency metrics and then compare the route efficiency metrics to determine that the alternative route 204c is optimized over, or ranked greater than, the alternative route 204b (e.g., for one or more of distance-based factors, route-based factors, and match-based factors). In response to this determination, the navigation routing system 106 can generate navigation instructions associated with the alternative route 204c, and can cause the provider client device to display the generated navigation instructions associated with the alternative route 204c.

Although FIG. 2 illustrates the navigation routing system 106 determining a fastest route between a pick-up location and a drop-off location, the navigation routing system 106 can determine routes between a variety of different locations (e.g., a first location and a second location). For instance, the navigation routing system 106 can determine an optimum alternative route between a current location of a provider device and a pick-up location. Similarly, the navigation routing system 106 can determine an optimum alternative route between a current location of a provider device and a staging location (e.g., a location for awaiting a next transportation match). Thus, the navigation routing system can determine routes between a first location and a second location associated with a transportation match.

Moreover, although FIG. 2 illustrates an example involving a ride transportation match (for transportation of a requestor), the navigation routing system 106 can also determine routes with regard to delivery transportation matches (for delivery of a package or parcel). For example, upon determining a delivery transportation match, the navigation routing system 106 can determine a route between a pick-up location for a package and a drop-off location for the package.

Figure 3:
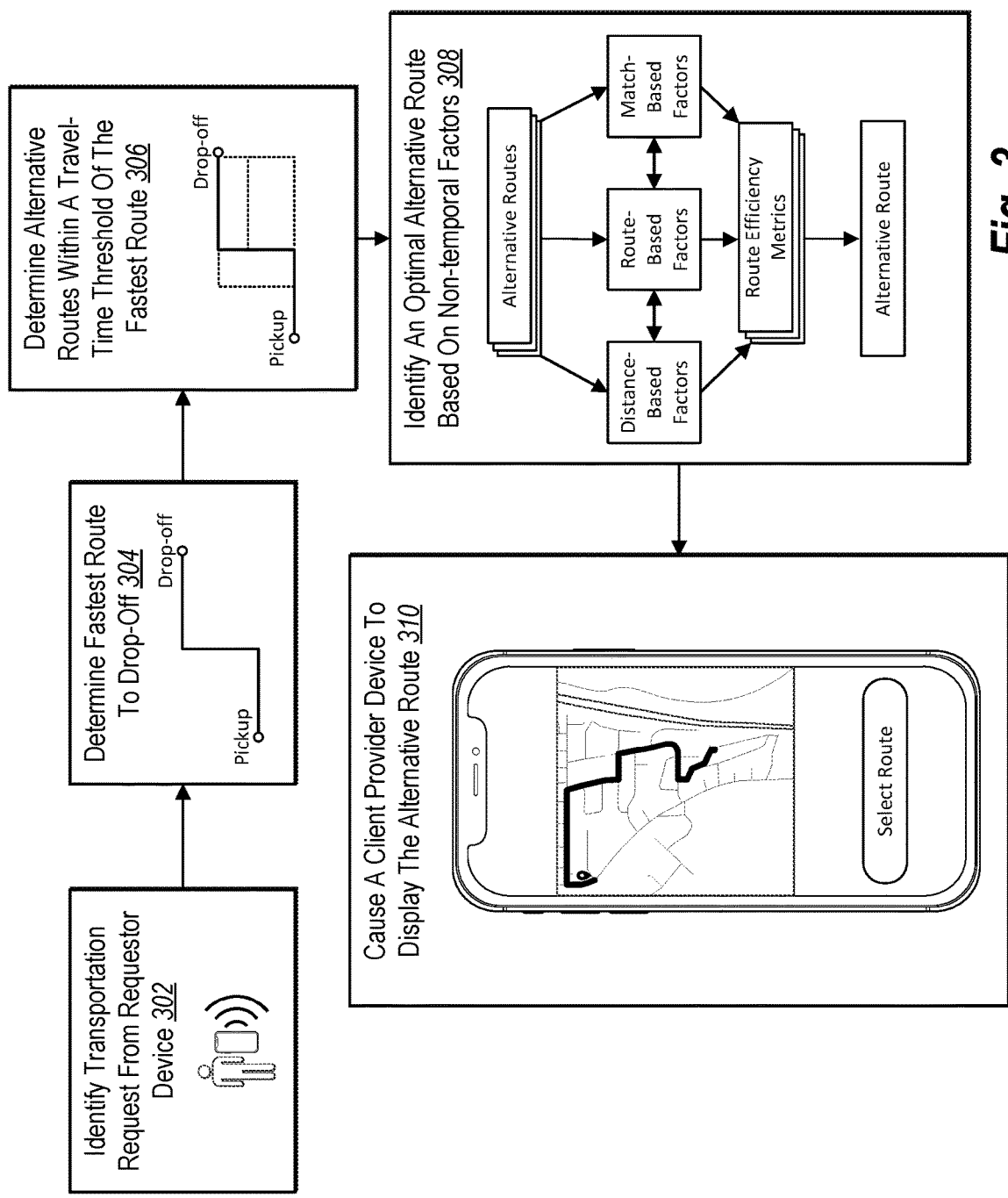
FIG. 3 illustrates a sequence diagram of the navigation routing system determining an optimal alternative route utilizing route efficiency metrics in accordance with one or more embodiments.

As mentioned above, the navigation routing system 106 can utilize a variety of models to determine non-temporal factors (and a route efficiency metric) for selecting an optimal alternative route. For example, FIG. 3 illustrates an overview sequence diagram of the navigation routing system 106 utilizing one or more models to determine non-temporal factors associated with alternative routes in order to determine an optimal alternative route. As depicted for an act 302, for example, the navigation routing system 106 can identify a transportation request from a requestor device. As illustrated for acts 304 and 306, the navigation routing system 106 can determine a fastest route and other alternative routes to the fastest route. Then, as illustrated in an act 308, the navigation routing system 106 can determine an optimal alternative route based on non-temporal factors. Finally, as illustrated in an act 310, the navigation routing system 106 can cause a user interface of the provider client device to display navigation instructions associated with the identified optimal alternative route.

As shown in FIG. 3, for example, the navigation routing system 106 performs the act 302 of identifying a transportation request from a requestor device. The act 302 can include identifying user interaction with a user interface via the requestor client device to initiate a transportation request. The act 302 can also include initiating a transportation match. For example, the act 302 can include identifying a provider device to service the transportation request. Furthermore, the act 302 can also include guiding the provider device to a pickup location to provide transportation. Thus, the navigation routing system 106 can also detect a provider arrival at a pickup location.

To illustrate, the navigation routing system 106 can receive notifications and information from the dynamic transportation matching system 104 each time a match is generated between a transportation request and a provider client device (e.g., one of the provider client devices 110a-110n). In one or more embodiments, for example, the navigation routing system 106 can detect that the provider client device 110a has arrived at the pickup location associated with an active transportation match by determining that a GPS positioning indicator associated with the provider client device 110a is at, or within, a threshold distance from the pickup location specified by the transportation match. Additionally or alternatively, the navigation routing system 106 can detect that the provider client device 110a has arrived at the pickup location by determining that the GPS positioning indicator associated with the provider client device 110a is within a threshold distance from a current position of the requestor client device (e.g., the requestor client device 116a) associated with the transportation match. Additionally or alternatively, the navigation routing system 106 can detect that the provider client device 110a has arrived at the pickup location in response to receiving a notification from the provider client device 110a (e.g., via the provider application 112a) that the provider client device 110a has made a self-determination associated with its position relative to the pickup location specified by the transportation match.

The navigation routing system 106 can provide non-temporal based routing instructions at any point during an active transportation match. For example, the navigation routing system 106 can provide non-temporal based routing instructions upon determining that the provider client device 110a has matched with a new transportation request. Additionally or alternatively, the navigation routing system 106 can provide non-temporal based routing instructions upon determining that the transportation vehicle 108a associated with the provider client device 110a has diverted from a previously provided route. Additionally or alternatively, the navigation routing system 106 can provide non-temporal based routing instructions in response to determining that a fastest route is no longer available (e.g., in response to identifying a road hazard, accident, or unanticipated traffic along the fastest route). Additionally or alternatively, the navigation routing system 106 can provide non-temporal based routing instructions in response to receiving a detected selection of a non-temporal route option from the provider client device 110a and/or the requestor client device 116a associated with the transportation match.

As further shown in FIG. 3, the navigation routing system 106 performs the act 304 of determining a fastest route to a location (e.g., the drop-off location) specified by the transportation match. To illustrate, the navigation routing system 106 can determine the fastest route based on travel times associated with one or more routes from the pickup location specified by the transportation match to the drop-off location specified by the transportation match. In one or more embodiments, the navigation routing system 106 can determine a travel time associated with a route based on a variety of factors, such as the distance of the route current and historic traffic patterns along the route, speed limits along the route, number of turns included in the route, number of traffic lights and stop signs along the route, road construction along the route, and current car accidents along the route.

After determining the fastest route from the pickup location to the drop-off location, the navigation routing system 106 performs the act 306 of determining multiple alternative routes from the pickup location to the drop-off location that are within a travel time threshold of the fastest route. In one or more embodiments, for example, the navigation routing system 106 can identify all alternative routes from the pickup location to the drop-off location. Additionally or alternatively, the navigation routing system 106 can identify a threshold number of alternative routes (e.g., ten alternative routes). Additionally or alternatively, the navigation routing system 106 can identify a threshold number of alternative routes that are no more than a threshold distance longer than the distance of the fastest route (e.g., no more than 15% longer in distance than the fastest route).

After identifying multiple alternative routes from the pickup location to the drop-off location, the navigation routing system 106 can identify a subset of alternative routes that are within a travel time threshold of the fastest route. As discussed above, the navigation routing system 106 determines that a particular route is the fastest route based on the travel time associated with the particular route. In order to ensure that the transportation experience of the requestor (e.g., the requestor 120a) is not degraded or negatively impacted, the navigation routing system 106 can determine an optimized alternative route based on non-temporal factors that is still within a travel time threshold of the fastest route.

In one or more embodiments, for example, the navigation routing system 106 determines the subset of alternative routes that are within the travel time threshold of the fastest route by determining travel times associated with each of the multiple alternative routes and then identifying those alternative routes with travel times within the travel time threshold of the travel time associated with the fastest route. The travel time threshold may be a static amount of time (e.g., two minutes). Additionally or alternatively, the travel time threshold may be a percentage of the travel time associated with the fastest route (e.g., 20% of the fastest route travel time). Additionally or alternatively, the navigation routing system 106 may dynamically determine the travel time threshold on a match-by-match basis based on: requestor information (e.g., the navigation routing system 106 may determine a shorter travel time threshold for a requestor with a longer and more active use history), provider information (e.g., the navigation routing system 106 may determine a longer travel time threshold for a provider with a higher rating), historical request activity for the area and day/time, and/or current system volume (e.g., the navigation routing system 106 may determine a shorter travel time threshold due to a current high level of transportation requests across the local transportation system).

To illustrate, if the travel time of the fastest route is five minutes and thirty seconds, and the travel-time threshold is two minutes, the navigation routing system 106 can determine that a seven minute travel time associated with the alternative route is within the travel-time threshold. Additionally or alternatively, the navigation routing system 106 can determine that the travel time of the alternative route is within the travel-time threshold relative to the travel time of the fastest route if the alternative route's travel time is not more than a threshold percentage longer than the fastest route's travel time. To illustrate, if the travel time of the fastest route is five minutes, and the travel-time threshold is one hundred and twenty percent of the travel time of the fastest route, the navigation routing system 106 can determine that a six minute and fifteen second travel time associated with the alternative route is not within the travel-time threshold. As mentioned above, the travel-time threshold can be a static value or percentage. Additionally or alternatively, the navigation routing system 106 can dynamically determine the travel-time threshold based on current transportation system volume, and/or information associated with the provider and/or requestor.

As further shown in FIG. 3, the navigation routing system 106 performs the act 308 of identifying an optimal alternative route (e.g., from the subset of alternative routes) based on non-temporal factors. In particular, the navigation routing system 106 can determine route efficiency metrics for the alternative routes and select an optimized alternative route by ranking the alternative routes based on the route efficiency metrics. To illustrate, the navigation routing system 106 can identify the optimal alternative route by applying one or more models to the subset of alternative routes in order to identify one or more alternative routes that are optimized based on, for example, one or more of distance-based factors (e.g., a distance efficiency metrics), route-based factors (e.g., route-segment access efficiency metrics, congestion efficiency metrics, and/or risk efficiency metrics, and match-based factors (e.g., match-based efficiency metrics for ride transportation matches and/or delivery transportation matches). As will be discussed in greater detail below with regard to FIGS. 4-7C, the navigation routing system 106 can determine non-temporal factors associated with each of the subset of alternative routes in order to determine corresponding route efficiency metrics. Based on these metrics, the navigation routing system 106 can identify one or more alternative routes that are optimized based on a combination of the non-temporal metrics.

As shown in FIG. 3, the navigation routing system 106 also performs the act 310 of causing a client provider device to display the identified alternative route. For example, the navigation routing system 106 can generate navigation instructions associated with the identified alternative route and cause the client provider device (e.g., the provider client device 110a associated with the provider 114a) to display the route and/or corresponding navigation instructions. In one or more embodiments, the navigation instructions can include an interactive map with the alternative route highlighted such that the provider can easily identify the path associated with the alternative route relative to a map of the surrounding area.

Although not illustrated in FIG. 3, in one or more embodiments, the navigation routing system 106 can detect a departure from the determined alternative route. For example, in the event that the provider decides not to follow the instructions associated with the determined alternative route (e.g., in response to thinking that they know a better route), the navigation routing system 106 can attempt to determine and provide another alternative route to the provider client device. To illustrate, the navigation routing system 106 can detect that the provider client device is departing from the determined alternative route in response to monitoring a current location of the provider client device relative to the alternative route. In at least one embodiment, the navigation routing system 106 can determine that the provider client device has departed from the alternative route when the current location is more than a threshold distance away from any point along the alternative route.

In response to detecting this departure, the navigation routing system 106 can repeat the acts 304-310 to put the provider client device (e.g., and the associated transportation vehicle carrying the requestor associated with the transportation match) on another alternative route optimized based on non-temporal factors. In an alternative embodiment, in response to detecting the departure of the provider client device from the alternative route, the navigation routing system 106 can fallback to a default state and provide updated route guidance associated with a fastest route from the current location of the provider client device to the drop-off location associated with the transportation match. In one or more embodiments, the navigation routing system 106 can detect a departure from the alternative route at any point along the alternative route. Additionally or alternatively, the navigation routing system 106 may only detect a departure from the alternative route at points along a threshold percentage of the alternative route (e.g., along the first half of the alternative route).

Figure 4:
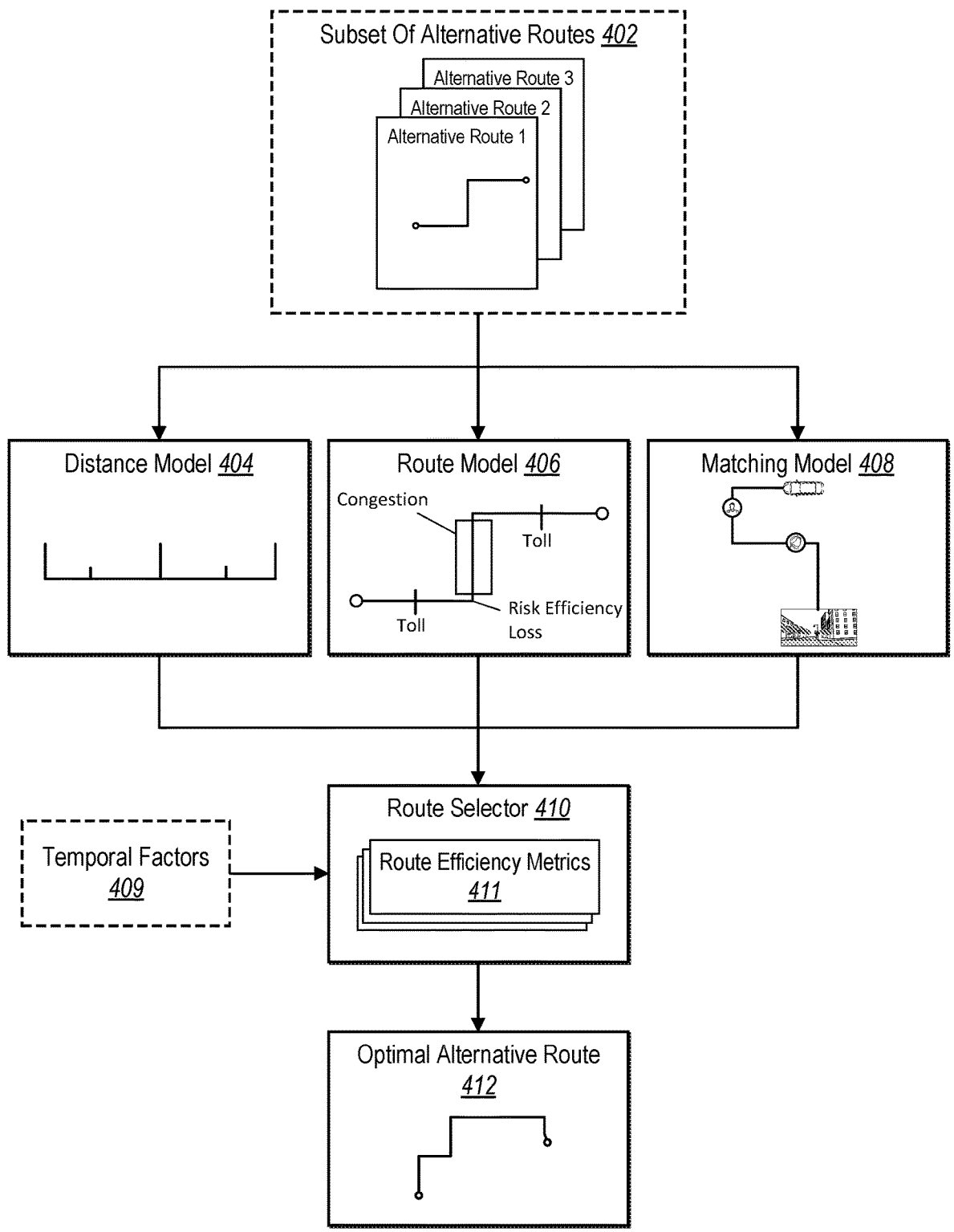
FIG. 4 illustrates a sequence diagram of the navigation routing system applying one or more models to a subset of alternative routes in order to determine route efficiency metrics and an optimal alternative route in accordance with one or more embodiments.

As mentioned previously, in one or more embodiments, the navigation routing system 106 can utilize various models to determine non-temporal factors, combine these non-temporal factors to determine route efficiency metrics, and then select an optimal alternative route based on the route efficiency metrics. For example, FIG. 4 illustrates an overview diagram of the navigation routing system 106 determining an optimal alternative route from a subset of alternative routes 402 associated with a transportation match. In particular, as shown in FIG. 4, the navigation routing system 106 applies one or more models 404-408 to each of the alternative routes in the subset of alternative routes 402 in order to determine non-temporal metrics associated with each alternative route. The navigation routing system 106 can then apply a route selector 410 to each alternative route in order to identify an optimal alternative route 412. In particular, the route selector 410 can combine various non-temporal factors (together with one or more temporal factors 409) to determine route efficiency metrics 411. The route selector 410 can then process the route efficiency metrics 411 to determine the optimal alternative route 412. In at least one embodiment, the route selector 410 determines the optimal alternative route 412 by ranking the alternative routes in the subset of alternative routes 402 based on the route efficiency metrics 411 and selecting the best-ranked alternative route as the optimal alternative route 412.

In more detail, the navigation routing system 106 can apply the distance model 404, the route model 406, and the matching model 408 to each of the subset of alternative routes 402. For example, the navigation routing system 106 applies the distance model 404 to distance-based factors associated with an alternative route to determine a distance efficiency metric associated with the alternative route. Additionally, the navigation routing system 106 applies the route model 406 to route-based factors associated with the alternative route to determine one or more of a route-segment access efficiency metric (e.g., a route-fulfillment metric), a risk efficiency metric (e.g., a provider-commitment metric), and a congestion efficiency metric (e.g., a route-congestion metric) associated with the alternative route. Moreover, the navigation routing system 106 applies the matching model 408 to match-based factors associated with the alternative route to determine a match-based efficiency metric reflecting the likelihood of additional ride transportation matches and/or delivery transportation matches along the route.

After determining one or more of the non-temporal metrics for each of the subset of alternative routes, the navigation routing system 106 applies the route selector 410. In one or more embodiments, for example, the route selector 410 utilizes the determined metrics associated with an alternative route in connection with one or more algorithms, heuristics, knowledge graphs, and/or models to determine a route efficiency score for the alternative route. In at least one embodiment, the route selector 410 then identifies the alternative route with the highest ranked route efficiency score as the optimal alternative route 412. Each of the models 404-410 is now discussed in detail.

Figure 5:
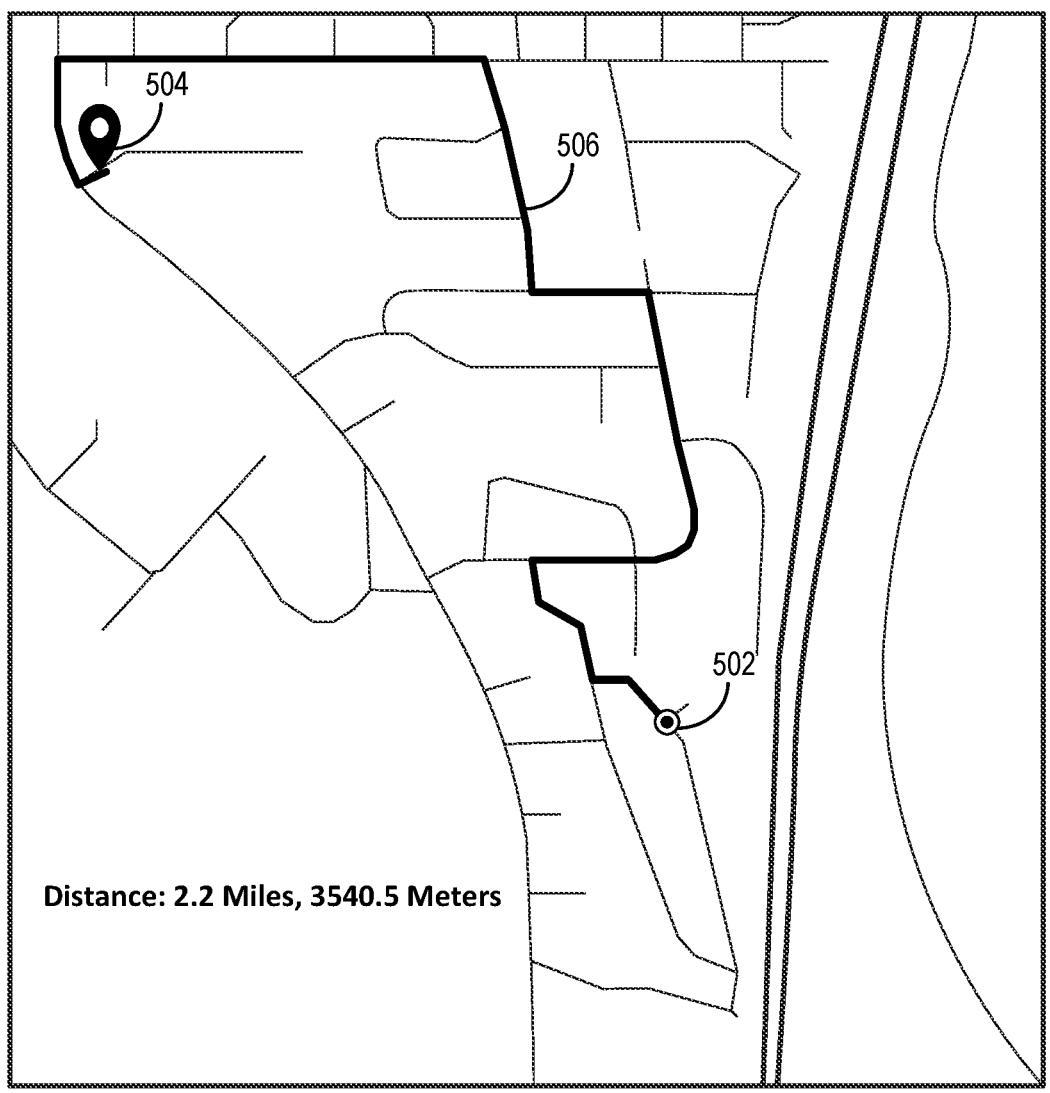
FIG. 5 illustrates an overview of the navigation routing system applying a distance model to an alternative route in accordance with one or more embodiments.

FIG. 5 illustrates an overview of the navigation routing system 106 applying the distance model 404 (e.g., discussed above in connection with FIG. 4) to an alternative route. As mentioned above, the navigation routing system 106 applies the distance model 404 to distance-based factors associated with an alternative route 506 from a pickup location 502 to a drop-off location 504 to determine a distance efficiency metric associated with the alternative route 506. The navigation routing system 106 can then apply the route selector 410 to the distance efficiency metric (and other metrics) in order to determine a route efficiency score for the alternative route 506.

In one or more embodiments, the navigation routing system 106 identifies distance-based factors associated with the alternative route 506. For example, the navigation routing system 106 can identify distance-based factors including a distance (e.g., 2.2 miles or 3540.5 meters) associated with the alternative route 506, and a distance efficiency weight associated with the provider device providing transportation along the alternative route 506 (e.g., the provider 114*a* associated with the provider client device 110*a* that is matched to the transportation request from the requestor 120*a* via the requestor client device 116*a*). To illustrate, the navigation routing system 106 can identify a distance associated with the alternative route 506 (e.g., in feet, miles, meters, kilometers) based on GPS data associated with the alternative route 506, and/or by map data associated with the alternative route 506.

As mentioned above, the navigation routing system 106 can utilize a unified efficiency framework to compare temporal and non-temporal factors in selecting an optimized alternative route. For example, the navigation routing system 106 can determine the distance efficiency weight based on a static or dynamic rate associated with the provider 114*a*. This allows the navigation routing system 106 to combine distance efficiency metrics with other non-temporal factors (and/or temporal factors) in determining a route efficiency metric. In one or more embodiments, the navigation routing system 106 utilizes a cost-based objective function to select the optimal alternative route. Accordingly, the navigation routing system 106 can convert non-temporal factors to efficiency measures utilizing a cost function.

To illustrate, the provider 114*a* may be associated with a rate per distance such as one-half of a cent per meter. Accordingly, the navigation routing system 106 can determine the distance efficiency weight as 0.5 cents per meter. Moreover, the distance model 404 can determine the distance efficiency metric as the distance (e.g., the number of meters in the alternative route 506) multiplied by the distance efficiency weight associated with the provider 114*a* (e.g., 3540.5 meters×0.5 cents for a distance efficiency metric of $17.70).

In one or more embodiments, the navigation routing system 106 determines a distance efficiency weight for the provider 114*a* in various ways. For example, in one embodiment, the navigation routing system 106 determines the distance efficiency weight for the provider 114*a* by identifying and utilizing one or more rate factors associated with the provider 114*a*. To illustrate, the navigation routing system 106 can access a profile associated with the provider 114*a* within the dynamic transportation matching system 104 to identify the static rate (e.g., 0.5 cents per meter). For instance, the navigation routing system 106 can determine the distance efficiency weight based on a fee rate corresponding to the provider, based on an insurance distance rate (e.g., an insurance cost based on distance), a measure of fueling efficiency (e.g., cost per mile), etc. Similarly, the distance efficiency weight can reflect computational costs (e.g., bandwidth and computer resources utilized per mile).

Additionally or alternatively, the navigation routing system 106 can determine the distance efficiency weight for the provider 114*a* by identifying the static rate associated with the provider 114*a*, and applying a multiplier to the static rate to reflect other rate factors such as, but not limited to, time of day (e.g., rush hour may have a higher multiplier than a low traffic time of day), the alternative route 506 (e.g., a city route may have a higher multiplier than a rural route), and/or a transportation matching system history associated with the provider 114*a* (e.g., a higher provider rating may have a higher multiplier than a lower rating, a longer use history may have a higher multiplier than a shorter use history). Additionally, the navigation routing system 106 can determine the distance efficiency weight for the provider 114*a* as a dynamic rate that depends on factors like overall system volume, regional system volume, or other variable or discretionary factors.

As mentioned above, in one embodiment, the distance model 404 determines the distance efficiency metric by multiplying a distance associated with the alternative route 506 by a distance efficiency weight associated with the provider 114a, where the distance efficiency weight is based on a combination of one or more distance efficiency factors. In additionally embodiments, the distance model 404 includes a machine learning model trained to generate a distance efficiency prediction indicating a likely distance efficiency weight. For example, the distance model 404 can generate an input vector based on one or more distance efficiency factors (e.g., provider rate, time of day, overall system volume). The distance model 404 can then apply the trained machine learning model to the input vector to generate a distance efficiency weight prediction. The distance model 404 then determines the distance efficiency metric by combining (e.g., multiplying) the distance associated with the alternative route 506 by the distance efficiency weight prediction output by the machine learning model.

Figure 6A:
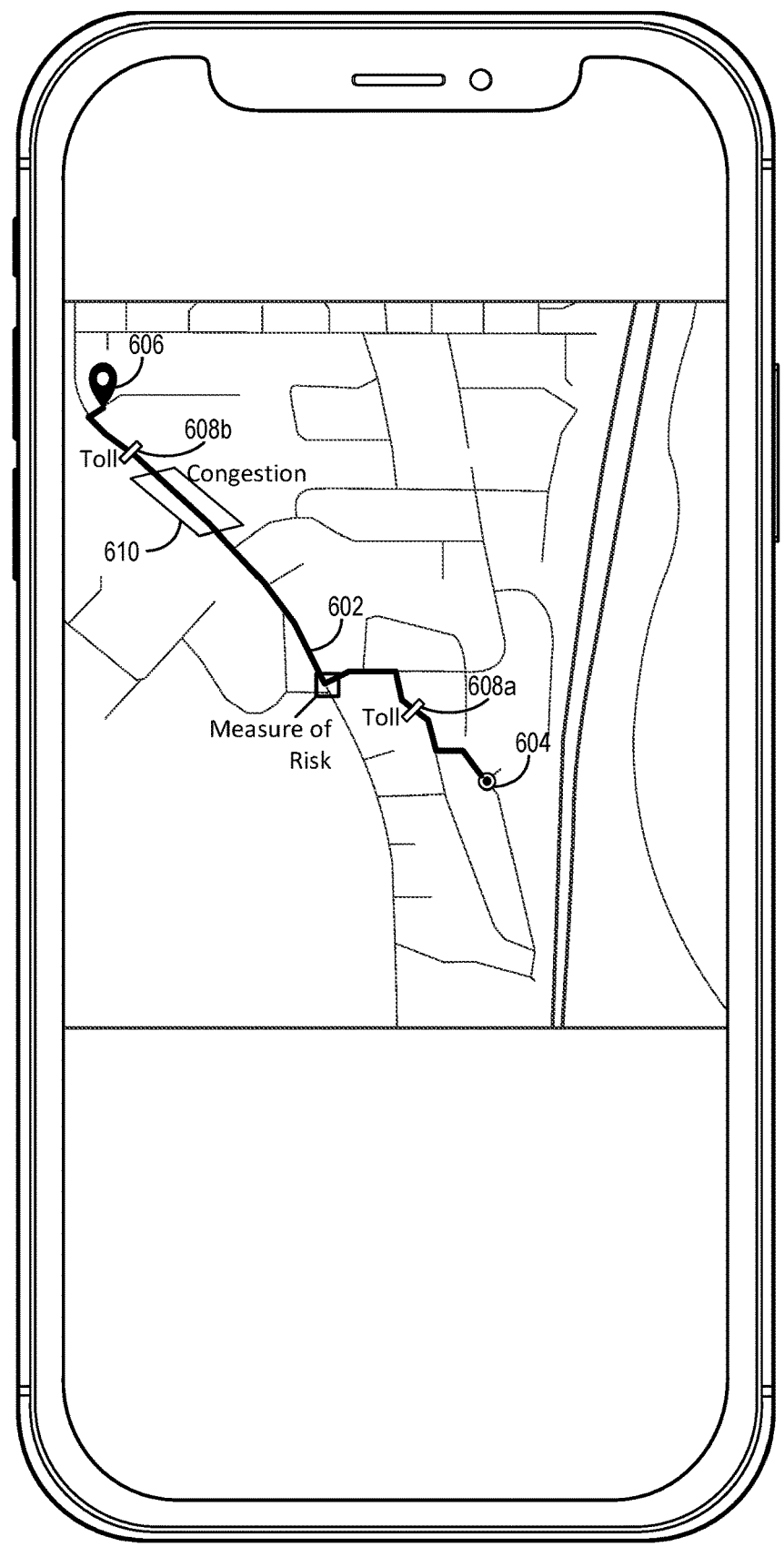
FIGS. 6A-6B illustrate overviews of the navigation routing system applying a route model to an alternative route to determine access efficiency metrics, congestion efficiency metrics, and risk efficiency metrics in accordance with one or more embodiments.
Figure 6B:
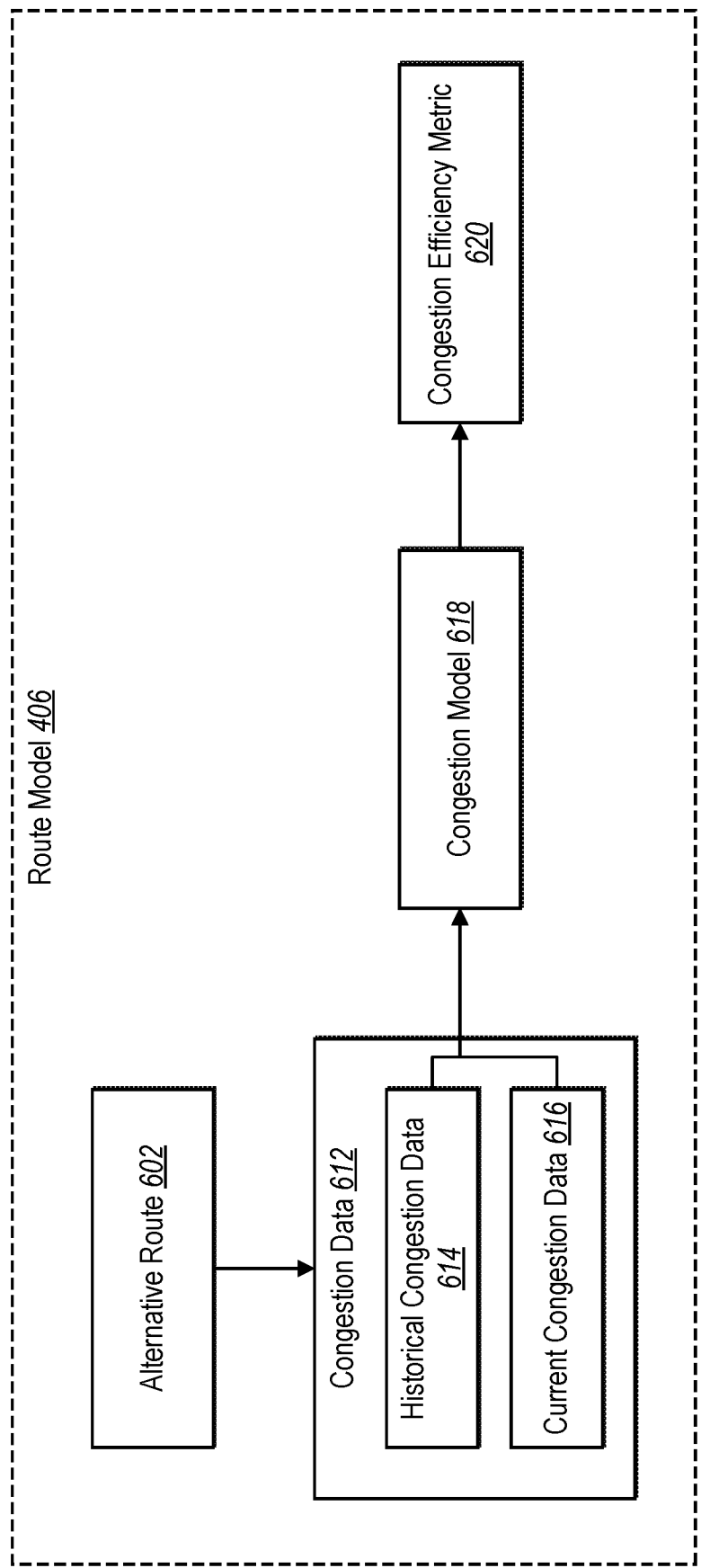

As mentioned above, the navigation routing system 106 can also apply a route model to determine various efficiency metrics. For example, FIGS. 6A and 6B illustrate overviews of the navigation routing system 106 applying the route model 406 (e.g., discussed above in connection with FIG. 4) to an alternative route. As mentioned above, the navigation routing system 106 applies the route model 406 to route-based factors associated with an alternative route 602 to determine one or more of a route-segment access efficiency metric, a risk efficiency metric, and a congestion efficiency metric associated with the alternative route 602. The navigation routing system 106 can then apply the route selector 410 to the route-segment access efficiency metric, the risk efficiency metric, and the congestion efficiency metric (and other metrics) in order to determine an optimized score (e.g., a route efficiency metric) for the alternative route 602.

In one or more embodiments, the navigation routing system 106 identifies route-based factors associated with the alternative route 602. As shown in FIG. 6A, the alternative route 602 has features including, but not limited to: navigation maneuvers (e.g., right-hand and left-hand turns); toll areas 608a, 608b; and at least one congestion area 610. In at least one embodiment, the navigation routing system 106 determines various metrics based on route-based factors corresponding to these and other route features.

To illustrate, the navigation routing system 106 can determine a route-segment access efficiency metric for the alternative route 602 based on the toll areas 608a, 608b associated with the alternative route 602. In one or more embodiments, the navigation routing system 106 determines the toll areas 608a, 608b and their associated toll amounts in various ways. For example, the navigation routing system 106 can maintain a regularly updated data repository of toll areas and toll amounts for the geographic region associated with the alternative route 602. Additionally or alternatively, the navigation routing system 106 can regularly, or in real-time, access public information (e.g., department of transportation web sites) to determine current toll amounts associated with toll areas.

The navigation routing system 106 can identify a first route-segment access penalty (e.g., a cost or toll amount) for the toll area 608a, and a second route-segment access penalty for the toll area 608b. In one or more embodiments, the navigation routing system 106 can determine the route-segment access efficiency metric for the alternative route 602 by adding the first route-segment access penalty and the second route route-segment access penalty. In additional or alternative embodiments, the navigation routing system 106 can determine the route-segment access efficiency metric for the alternative route 602 based on any type of route-segment access penalty (e.g., other than those associated with tolls). For example, the alternative route 602 may include segments that are associated with a cost or charge only during certain times of day (e.g., during rush hour).

Additionally or alternatively, the alternative route 602 may include charges or credits associated with various types of travel lanes. For instance, the alternative route 602 may include a one or more segments that include a high occupancy vehicle (HOV) lane that is associated with a fee if the transportation vehicle 108 is carrying fewer than two passengers. In another example, the alternative route 602 may include one or more segments that include a pay-as-you-go lane that is associated with a fee that is multiplied over travel distance. In yet another example, the alternative route 602 may include one or more segments that include electric-vehicle-only lanes or hybrid-vehicle-only lanes (with an access cost corresponding to the difference in cost between a non-hybrid and hybrid vehicle).

In addition to the route-segment access efficiency metric, the navigation routing system 106 also determines a risk efficiency metric corresponding to the alternative route 602 utilizing route-based factors associated with the alternative route 602. In particular, the navigation routing system 106 can determine a likelihood of interruption events for a provider vehicle based on route-based factors (such as features of particular segments or regions along a route). The navigation routing system 106 can determine a likelihood of interruption events based on a variety of predicted events, such as vehicle accidents/damage, vehicle stoppages (e.g., being pulled over by law enforcement), or other events that interrupt transportation services.

For example, the navigation routing system 106 can identify navigational maneuvers (e.g., static route-based factors) corresponding to an alternative route and determine risk efficiency measures corresponding to the navigational maneuvers. For example, the navigation routing system 106 can determine navigational maneuvers corresponding to the alternative route 602 including total number of turns in the alternative route 602 (e.g., a higher number of turns may be correlated with a higher likelihood of interruption events), number of right-hand versus left-hand turns in the alternative route 602 (e.g., left-hand turns are more frequently associated with interruption events), and road type (e.g., highway versus surface street) associated with the alternative route 602. Additionally, the navigation routing system 106 can identify other dynamic route-based factors associated with the alternative route 602 including current traffic levels and severity along the alternative route 602, road closures along the alternative route 602, and construction areas along the alternative route 602.

As mentioned, the navigation routing system 106 can also determine risk efficiency measures (e.g., risk efficiency weights) corresponding to different navigational maneuvers (or other route-based risk factors). For example, the navigation routing system 106 can determine a frequency of interruption events corresponding to right hand turns and a frequency of interruption events corresponding to left hand turns. Similarly, the navigation routing system 160 can determine an average cost of interruption events corresponding to these navigational maneuvers. The navigation routing system 160 can apply historical frequency and cost measures to determine a risk efficiency measure for each navigational maneuver.

Moreover, the navigation routing system 106 can combine individual risk efficiency measures to determine an overall risk efficiency metric for a route. For example, the navigation routing system 106 can combine risk efficiency measures for turns, highway access maneuvers, crowded driving regions, highway driving routes, etc. to determine an overall risk efficiency metric for an alternative route. The navigation routing system 106 can combine these risk efficiency measures in a variety of ways, such as averaging, adding, or multiplying.

In one or more embodiments, the navigation routing system 106 applies the route model 406 to static and dynamic route-based factors to determine the risk efficiency metric associated with the alternative route 602 (or individual segments/maneuvers). For example, in at least one embodiment, the route model 406 includes a machine learning model that is trained to generate a cost prediction (e.g., a cost of interruption events, such as an average replacement cost or an insurance cost) associated with the alternative route 602. To illustrate, the route model 406 can generate an input vector based on the one or more of the identified static and/or dynamic route-based factors. The route model 406 can then apply the trained machine learning model to the input vector to generate an risk efficiency prediction associated with the alternative route 602.

In at least one embodiment, the navigation routing system 106 can train the machine learning model to generate a risk efficiency prediction indicating the likelihood of a interruption event in connection with an alternative route (or segment, region, or maneuver) based on the route-based factors. The route model 406 can then determine the risk efficiency metric for the alternative route 602 based on a risk efficiency weight (e.g., cost) associated with the number and severity of interruption events predicted by the machine learning model. Additionally or alternatively, the navigation routing system 106 can train the machine learning model to generate the risk efficiency metric indicating an expected cost in connection with an alternative route based on the route-based factors. Regardless of how the machine learning model is trained, the navigation routing system 106 can utilize historical provider insurance costs associated with the area surrounding the alternative route 602.

In one or more embodiments, the navigation routing system 106 can generate and/or utilize a risk efficiency map that reflects risk efficiency measures for individual regions, segments, and/or maneuvers for one or more locations. Indeed, the navigation routing system 106 can utilize historical data (and/or a machine learning model) to generate the risk efficiency map and then store the risk efficiency map to access when determining a route. The navigation routing system 106 can compare an alternative route with the risk efficiency map and extract risk efficiency measures for regions, segments, and/or maneuvers along the alternative route.

Moreover, in addition to the route-segment access efficiency metric and the risk efficiency metric associated with the alternative route 602, the navigation routing system 106 also determines a congestion efficiency metric associated with the alternative route 602. As shown in FIG. 6A, the alternative route 602 includes the congestion area 610. In one embodiment, the congestion area 610 is a segment of the alternative route 602 that is congested (e.g., has traffic).

Traveling through the congestion area 610 may have a negative impact on efficiency and, in some instances, congestion efficiency can be mandated by government entities. For example, the congestion area 610 may be a segment of the alternative route 602 where a local jurisdiction (e.g., a transportation authority of the city where the alternative route 602 is located) is seeking to avoid congestion. For example, the city where the alternative route 602 is located may impose a tax, fine, or limit on transportation that travels through the congestion area 610 as a means of discouraging a high number of vehicles to travel though the congestion area 610 at a single time (i.e., creating a traffic jam, increasing pollution). In one or more embodiments, the navigation routing system 106 can determine congestion measures for regions and/or segments of an alternative route. The navigation routing system 106 can determine congestion efficiency weights and convert the congestion measures to congestion efficiency metrics. Thus, for example, the navigation routing system 106 can determine a measure of congestion (e.g., vehicles per mile or a designation of a city center), identify a congestion efficiency weight (e.g., a cost per vehicle per mile or an efficiency penalty corresponding to a city center), and then apply the congestion efficiency weight to the measure of congestion to determine the congestion efficiency metric.

For example, as shown in FIG. 6B, the navigation routing system 106 can apply the route model 406 to information associated with the congestion area 610 to determine a congestion efficiency metric 620 associated with the alternative route 602. For example, the route model 406 can identify congestion data 612 (e.g., a measure of congestion) associated with the alternative route 602. In one or more embodiments, the route model 406 can identify congestion data 612 including historical congestion data 614 and current congestion data 616. In more detail, the route model 406 can identify historical congestion data 614 including: one or more patterns associated with the alternative route 602 during one or more periods of time (e.g., indicating the congestion area 610 as an area that historically experiences congestion during weekdays), historical accident data associated with the alternative route 602 during one or more periods of time (e.g., indicating the congestion area 610 as an area that historically experiences one or more accidents most weeknights), information associated with one or more areas surrounding the alternative route 602 (e.g., indicating the congestion area 610 is near a residential area, a school zone, a hospital zone), and public policies and/or laws associated with congestion in connection with the alternative route 602 (e.g., indicating the congestion area 610 as a road segment where transportation vehicles are subjected to an additional fee when traveling during a particular day and/or time of day). Additionally, the route model 406 can identify current congestion data 616 including real-time congestion data (e.g., traffic data) associated with the alternative route 602 (e.g., indicating a severity level of congestion or traffic in the congestion area 610). For example, the route model 406 can access publicly available information (e.g., a department of transportation website) to identify real-time congestion data.

In one or more embodiments, as shown in FIG. 6B, the route model 406 can apply a congestion model 618 to the congestion data 612 to generate the congestion efficiency metric 620 associated with the alternative route 602. As mentioned above, in some embodiments, the congestion model 618 comprises an algorithm that determines and applies congestion efficiency weights to congestion measures. In some embodiments, the congestion model 618 comprises a machine learning model that generates predicted congestion measures, congestion efficiency weights, and/or congestion efficiency metrics.

For example, the navigation routing system 106 can train the congestion model 618 utilizing historical congestion data associated with routes within the geo-fence, town, and/or city that includes the alternative route 602 to generate congestion efficiency metrics reflecting a congestion efficiency weight (e.g., a congestion cost) corresponding to the training routes. Accordingly, the route model 406 can apply the trained congestion model 618 to the congestion data 612 to generate the congestion efficiency metric 620 that reflects an estimated congestion score or cost associated with the alternative route 602.

Figure 7A:
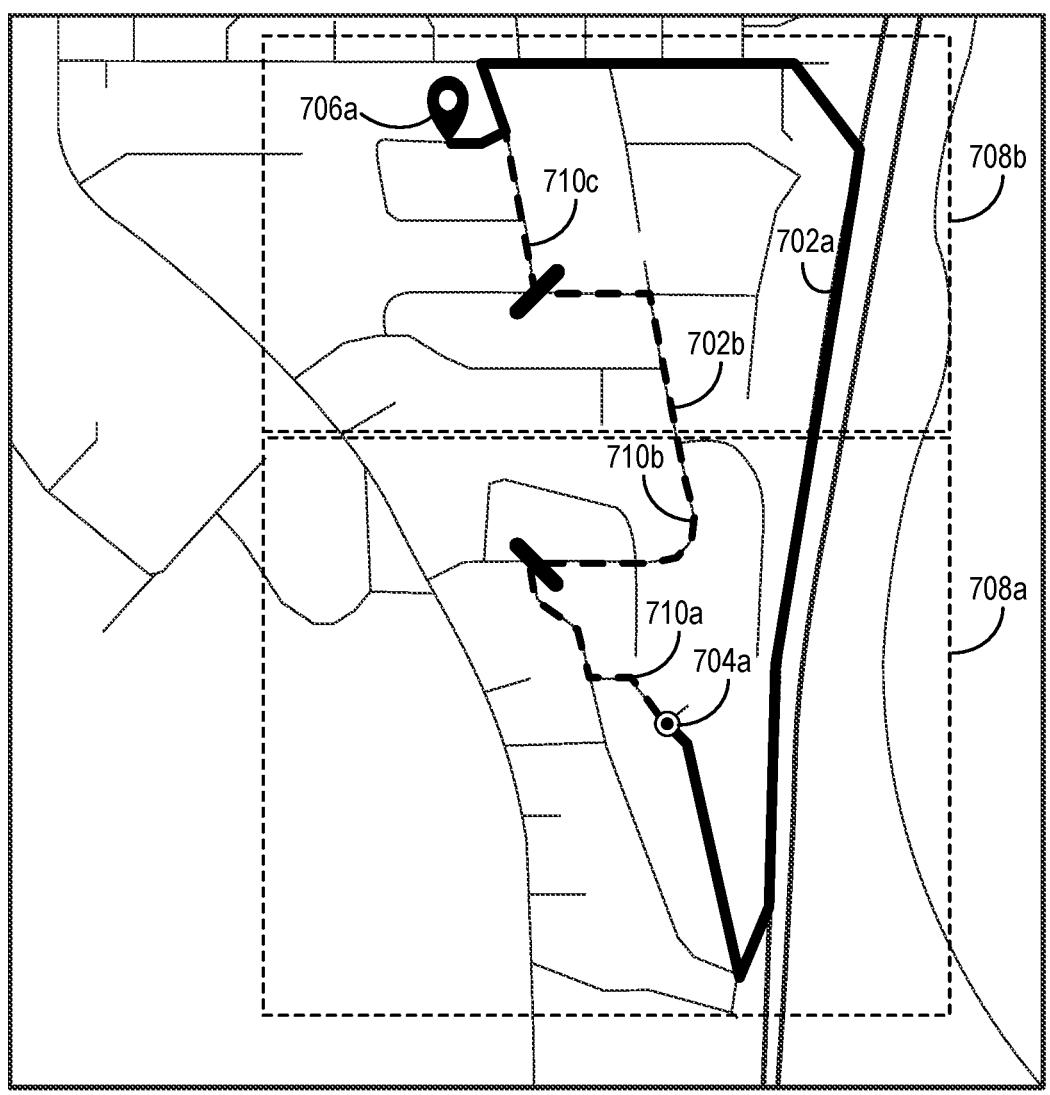
FIGS. 7A-7C illustrate overviews of the navigation routing system applying a matching model to alternative routes to determine match-based efficiency metrics in accordance with one or more embodiments.
Figure 7B:
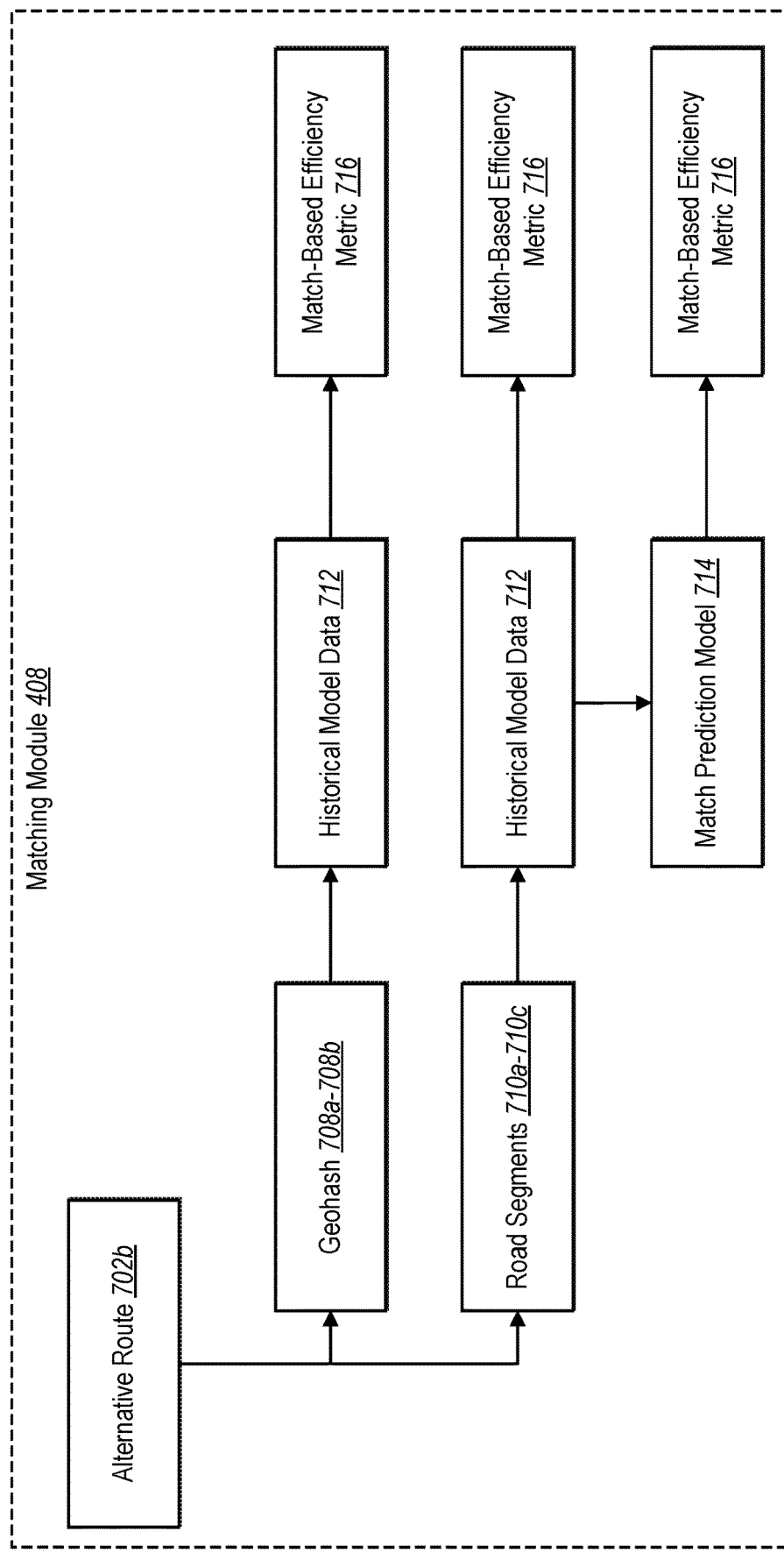
Figure 7C:
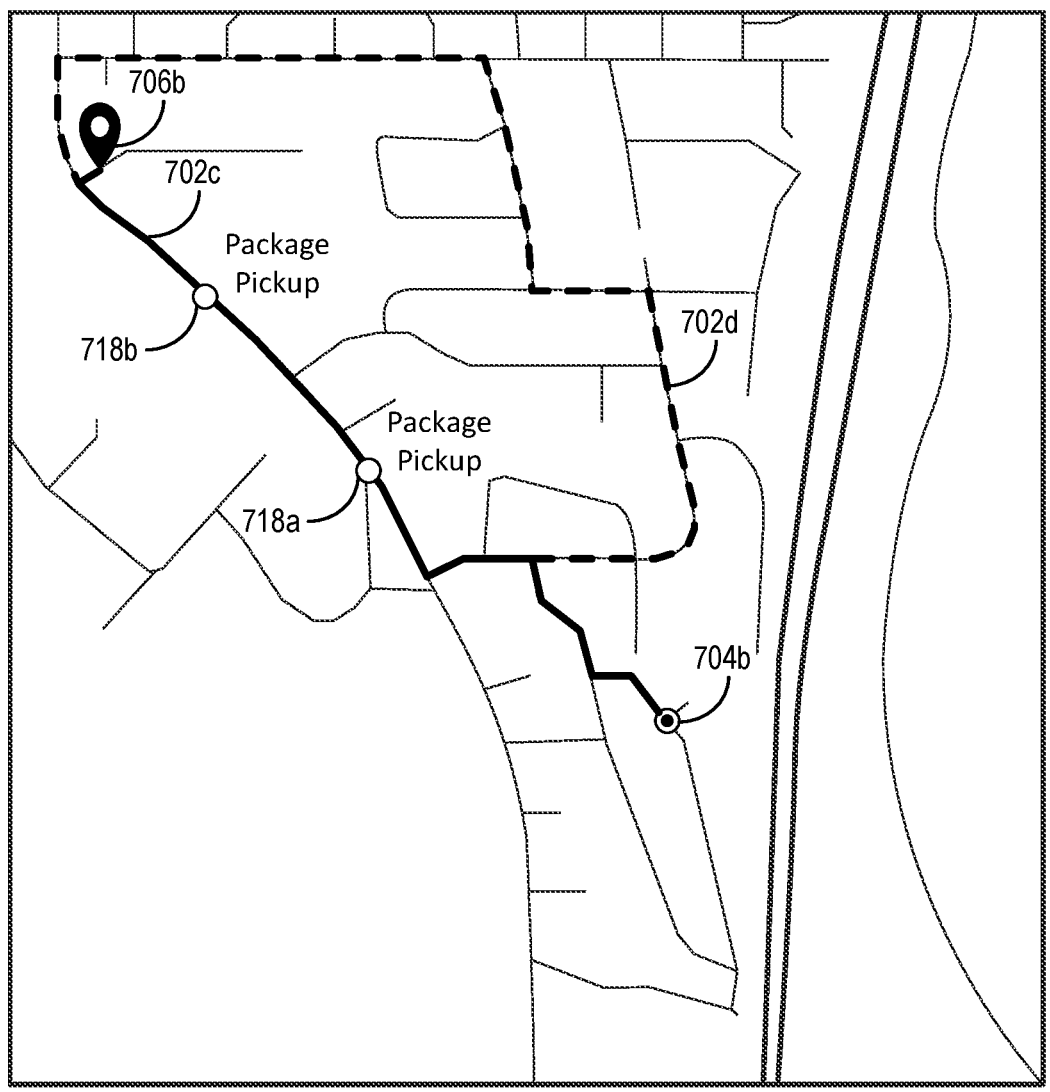

As discussed above, the navigation routing system 106 can also determine a match efficiency metric for alternative routes. FIGS. 7A, 7B, and 7C illustrate the navigation routing system 106 applying the matching model 408 (e.g., discussed above in connection with FIG. 4) to one or more alternative routes. As mentioned above, the navigation routing system 106 applies the matching model 408 to match-based factors associated with an alternative route to determine a match efficiency metric for ride transportation matches and/or delivery transportation matches. The navigation routing system 106 can then apply the route selector 410 to the match efficiency metric (and other metrics) in order to determine an optimized score for the alternative route.

In one or more embodiments, the navigation routing system 106 identifies match-based factors associated with an alternative route. In one or more embodiments, an alternative route may be associated with match-based factors that indicate that transportation along the alternative route is more likely to be matched to a shared transportation request. For example, the navigation routing system 106 can determine that an alternative route more efficiently utilizes the transportation network if the alternative route is more likely to be matched to a shared transportation request from a second requestor (e.g., the requestor 120n) who shares transportation with the initial requestor (e.g., the requestor 120a) in the transportation vehicle (e.g., the transportation vehicle 108a) along the alternative route.

In one or more embodiments, the navigation routing system 106 determines that an alternative route is more likely to be matched to a shared transportation request if the alternative route is associated with match-based factors indicating 1) the alternative route is associated with a higher expected demand density (e.g., the alternative route is popular and/or near large venues that have a higher matching likelihood), 2) the alternative route is "detour-friendly" (e.g., easier to enter and exit in order to pick up a shared requestor), and/or 3) the alternative route is more pickup and drop-off appropriate (e.g., easy for a provider to pull the transportation vehicle over to pick up a shared requestor). Accordingly, the navigation routing system 106 can identify match-based factors associated with the alternative route including, but not limited to: a road-type associated with the alternative route (e.g., freeway versus surface streets), historical transportation volume associated with the alternative route, high-volume venues near the alternative route (e.g., airports, sports stadiums, concert arenas), entering and exiting ease associated with the alternative route, and stopping ease associated with the alternative route.

To illustrate, FIG. 7A shows a first alternative route 702a and a second alternative route 702b, both alternative routes 702a, 702b from a pickup location 704a (e.g., an airport) to a drop-off location 706a (e.g., a private residence). The alternative routes 702a, 702b pass through geohashes 708a and 708b, and the alternative route 702b includes road segments 710a, 710b, and 710c. The navigation routing system 106 can identify match-based factors associated with the alternative route 702a including that: the alternative route 702a mostly follows a freeway, the alternative route 702a is associated with a high historical transportation volume, the alternative route 702a does not pass by any high-volume venues, the alternative route 702a is associated with a low entering and exiting ease (e.g., due to infrequent freeway entrances and exits within the alternative route 702a), and the alternative route 702a is associated with a low stopping ease. The navigation routing system 106 can also identify match-based factors associated with the alternative route 702b including that: the alternative route 702b mostly follows surface streets, the alternative route 702b is associated with a moderate historical transportation volume, the alternative route 702b passes very near a large venue (e.g., the stadium), the alternative route 702b is associated with a high entering and exiting ease, and the alternative route 702b is associated with a high stopping ease.

In one or more embodiments, the navigation routing system 106 can utilize computer implemented models (e.g., machine learning models) to generate a transportation match prediction based on various route factors. The transportation match prediction can include a prediction of a percentage likelihood or number of transportation matches along a particular route segment (or within a particular region). The navigation routing system 106 can determine a match efficiency weight and apply the match efficiency weight to the transportation match prediction to generate a match efficiency metric.

In one or more embodiments, the navigation routing system 106 determines a match efficiency weight (e.g., a cost) that either penalizes or incentivizes shared transportation and/or deliveries along a given route. For example, the navigation routing system 106 can determine a historical decreased cost (or increased revenue) associated with one or more shared transportation matches. The match efficiency weight can reflect reduced computational resources in servicing a shared ride request or other reduced resources utilized in identifying a shared transportation match. The navigation routing system 106 can utilize this cost/revenue as a match efficiency weight to convert a predicted transportation match to a match efficiency metric. Similarly, the navigation routing system 106 can analyze current features or factors to predict a match efficiency weight corresponding to a transportation match prediction associated with a route or route segment at a current time (or reflecting other current conditions).

Indeed, the navigation routing system 106 can determine a match efficiency weight based on a variety of other factors such as pollution levels, population density (e.g., incentivizing shared transportation in highly populated areas), etc. In at least one embodiment, the navigation routing system 106 can determine a dynamic match efficiency weight that balances a combination of multiple match-based factors (e.g., including historical data and/or current data) associated with a given route. Regardless of the match-based factors or other data reflected by the match efficiency weight, the navigation routing system 106 can utilize the match efficiency weight to convert a transportation match prediction to a match efficiency metric.

In more detail, FIG. 7B illustrates the navigation routing system 106 applying one or more models of the matching model 408 to the match-based factors associated with an alternative route (e.g., the alternative route 702b) to generate a transportation match prediction (and/or a match efficiency weight/match efficiency metric) associated with the alternative route. For example, in response to receiving the one or more match-based factors associated with the alternative route 702b, the matching model 408 can apply one or more of a historical data model 712 and a match prediction model 714 to the alternative route 702b. In one or more embodiments, the historical data model 712 generates a transportation match prediction (and/or a match-based efficiency metric 716) based on historical shared transportation data associated with one or more geohashes 708a-708b or one or more road segments 710a-710c of the alternative route 702b. Additionally, in one or more embodiments, the match prediction model 714 predicts the transportation match prediction (and/or match-based efficiency metric 716) based on both historical shared transportation data associated with one or more road segments 710a-710c of the alternative route 702b in combination with a shared transportation forecast over a future period of time associated with the alternative route 702b. Each of the models 712-714 will now be discussed in detail.

As shown in FIG. 7B, the matching model 408 can apply the historical data model 712 to historical shared transportation data associated with one or more geohashes 708a-708b of the alternative route 702b. In one or more embodiments, a geohash of an alternative route is an encoding of coordinates that define a geographic area through which the alternative route passes. As mentioned above, the alternative route 702b passes through the geohashes 708a and 708b. Accordingly, the matching model 408 can identify historical shared transportation data associated with each of the geohashes 708a-708b including but not limited to a number of shared transportations experienced within each geohash 708a, 708b during a specified time period of time (e.g., the same hour of the day across a previous number of days and/or weeks). In at least one embodiment, the matching model 408 can apply the historical data model 712 to the identified historical shared transportation data associated with the geohashes 708a-708b to generate a predicted shared transportation volume for each of the geohashes 708a-708b. To illustrate, at 9 am on a Friday morning, the matching model 408 can apply the historical data model 712 to historical shared transportation data indicating that the geohash 708a experienced a low volume of shared transportation during the previous five mornings. The historical data model 712 can generate a prediction that, for Friday morning, the geohash 708a will experience the same low volume of shared transportation.

The matching model 408 can also apply the historical data model 712 to historical shared transportation data associated with one or more road segments 710a-710c of the alternative route 702b. In one or more embodiments, a road segment of an alternative route is a sub-length of the total distance of the alternative route. Road segments may be delineated by streets, stop lights and signs, speed limit zones, toll roads, or similar. Accordingly, the matching model 408 can identify historical shared transportation data associated with each of the road segments 710a-710c of the alternative route 702b including but not limited to a number of shared transportations within each road segment 710a-710c during a specified period of time (e.g., the same hour of the day across a previous number of days and/or weeks). In at least one embodiment, the matching model 408 can apply the historical data model 712 to the identified historical shared transportation data associated with the road segments 710a-710c to generate a predicted shared transportation volume for each of the road segments 710a-710c.

In one or more embodiments, whether in connection with the geohashes 708a-708b or the road segments 710a-710c, the matching model 408 can generate the match-based efficiency metric 716 based on the predicted shared transportation volumes generated by the historical data model 712. For example, in response to the historical data model 712 generating one or more predicted shared transportation volumes for the geohashes 708a-708b and/or the road segments 710a-710c across the alternative route 702b, the matching model 408 can determine a transportation match prediction by combining the one or more predicted shared transportation volumes across the geohashes 708a-708b and/or the road segments 710a-710c, selecting the highest of the one or more predicted shared transportation volumes across the geohashes 708a-708b and/or the road segments 710a-710c, or determining an average of the one or more predicted shared transportation volumes across the geohashes 708a-708b and/or the road segments 710a-710c.

In one or more embodiments, the matching model 408 further converts the transportation match prediction to a match-based efficiency metric within the common efficiency framework. For example, as discussed above, the navigation routing system 106 determines a match efficiency weight (e.g., a cost) associated with a transportation match. In at least one embodiment, the matching model converts the transportation match prediction by combining the transportation match prediction with the match efficiency weight to generate the match-based efficiency metric. For instance, if the transportation match prediction associated with the alternative route 702b is three predicted shared transportation requests and the determined match efficiency weight is five cents per predicted shared transportation request, the matching model 408 can determine that the match-based efficiency metric for the alternative route 702b is fifteen cents (e.g., three requests multiplied by five cents).

In one or more additional embodiments, the matching models can further apply the match prediction model 714 to the one or more predicted shared transportation volumes to determine the match-based efficiency metric 716. As mentioned above, the match prediction model 714 generates a transportation match prediction based on historical shared transportation volumes in combination with a shared transportation forecast for a future period of time (e.g., over the next hour). For example, the match prediction model 714 can utilize the historical shared transportation volumes associated with an alternative route associated with a current time period in connection with: current transportation volumes (e.g., for shared and non-shared transportation) associated with the alternative route 702b and surrounding areas, current and future events located on or near the alternative route 702b (e.g., sports games, concerts, conventions), current and forecasted weather on or near the alternative route 702b, and current and forecasted traffic on or near the alternative route 702b. Based on all these considerations and as discussed above, the match prediction model 714 can generate the match-based efficiency metric 716 associated with the alternative route 702b by combining the determined transportation match prediction with the match efficiency weight.

FIG. 7C illustrates the navigation routing system 106 applying the matching model 408 to match-based factors associated with an alternative route to generate a match-based efficiency metric for delivery transportation matches associated with the alternative route. In one or more embodiments, the navigation routing system 106 optimizes a transportation network by identifying alternate routes that are more likely to be matched to deliveries (e.g., new deliveries and/or scheduled deliveries). Accordingly, the navigation routing system 106 can identify match-based factors associated with an alternative route that include a number of delivery locations (e.g., package pickups, package drop-offs) on or near the alternative route.

To illustrate, as shown in FIG. 7C, the navigation routing system 106 can identify a first alternative route 702c and a second alternative route 702d from a pickup location 704b to a drop-off location 706b. The navigation routing system 106 can determine that the alternative route 702c includes package pickups 718a, 718b, while the alternative route 702d includes no package pickups. Accordingly, the navigation routing system 106 can apply the matching model 408 to the identified package pickups 718a, 718b on the alternative route 702c to determine a delivery match-based efficiency metric associated with the alternative route 702c.

For example, the matching model 408 can determine a delivery match-based efficiency metric for the alternative route 702c that indicates a value that is saved and/or generated by sharing requestor transportation with one or more deliveries associated with the package pickups 718a, 718b in connection with the alternative route 702c. The matching model 408 can further determine that there is no delivery match-based efficiency metric associated with the alternative route 702d. To illustrate, the matching model 408 can first generate a delivery prediction for each of the alternative routes 702c, 702d, identify a match efficiency weight associated with the alternative routes 702c, 702d, and determine delivery match-based efficiency metrics for each of the alternative routes 702c, 702d based on the delivery predictions and match efficiency weights.

In more detail, the matching model 408 generates a delivery prediction for a particular alternative route based on various delivery factors associated with that route. For example, the matching model 408 can identify delivery factors including, but not limited to number of package location associated with the route, historical volume of package pickups and drop offs associated with the route, and future scheduled package pickups and deliveries associated with the route. In at least one embodiment, the matching model 408 generates the delivery prediction by generating an input vector based on the identified delivery factors, and applying a trained machine learning model to the input vector to generate the delivery prediction. For example, the matching model 408 can train the machine learning model to utilizing historical delivery data such that the machine learning model generates an accurate delivery prediction reflecting a predicted number of delivery transportation match requests associated with a particular alternative route.

Additionally, the matching model 408 determines a match efficiency weight associated with an alternative route. As discussed above, the matching model 408 determines the match efficiency weight that converts a delivery prediction associated with the alternative route to a delivery match-based efficiency metric (e.g., a cost metric). For instance, the match efficiency weight can reflect the value associated with a predicted delivery (e.g., an average value based on historical packages corresponding to the route or location). The match efficiency weight can also reflect reduced computing resources or other resources associated with adding a delivery transportation match. As mentioned above, the matching model 408 can include a machine learning model that can predict a match efficiency weight cased on a variety of factors corresponding to a match, route, segment, or region.

The matching model 408 further determines the delivery match-based efficiency metric associated with an alternative route based on the delivery prediction for the alternative route and the match efficiency weight for the alternative route. For example, the matching model 408 can determine the delivery match-based efficiency metric for the alternative route by multiplying the delivery prediction by the match efficiency weight. To illustrate, the matching model 408 can multiply a delivery prediction of three deliveries by a match efficiency weight of three cents per delivery to determine a delivery match-based efficiency metric of nine cents.

In additional or alternative embodiments, the navigation routing system 106 can further apply one or more models to the first and second alternative routes 702c, 702d to generate one or more predictions indicating future deliveries associated with the first and second alternative routes 702c, 702d. For example, the navigation routing system 106 may apply a prediction model trained with historical delivery information to the routes 702c, 702d to generate predictions indicating that the second alternative route 702d is likely to experience a greater number of deliveries, even though the second alternative route 702d includes no package pickups. In at least one embodiment, the navigation routing system 106 can determine a delivery metric associated with the second alternative route 702d based on this prediction.

Additionally or alternatively, the navigation routing system 106 can determine a delivery metric for either of the first or second alternative routes 702c, 702d based on scheduled deliveries. For example, the navigation routing system 106 can access a delivery schedule for future deliveries to determine that one or more future deliveries are associated with either of the first or second alternative route 702c, 702d. Thus, the navigation routing system 106 can further determine delivery metrics associated with the first and second alternative routes 702c, 702d based on the identified scheduled deliveries.

Figure 8:
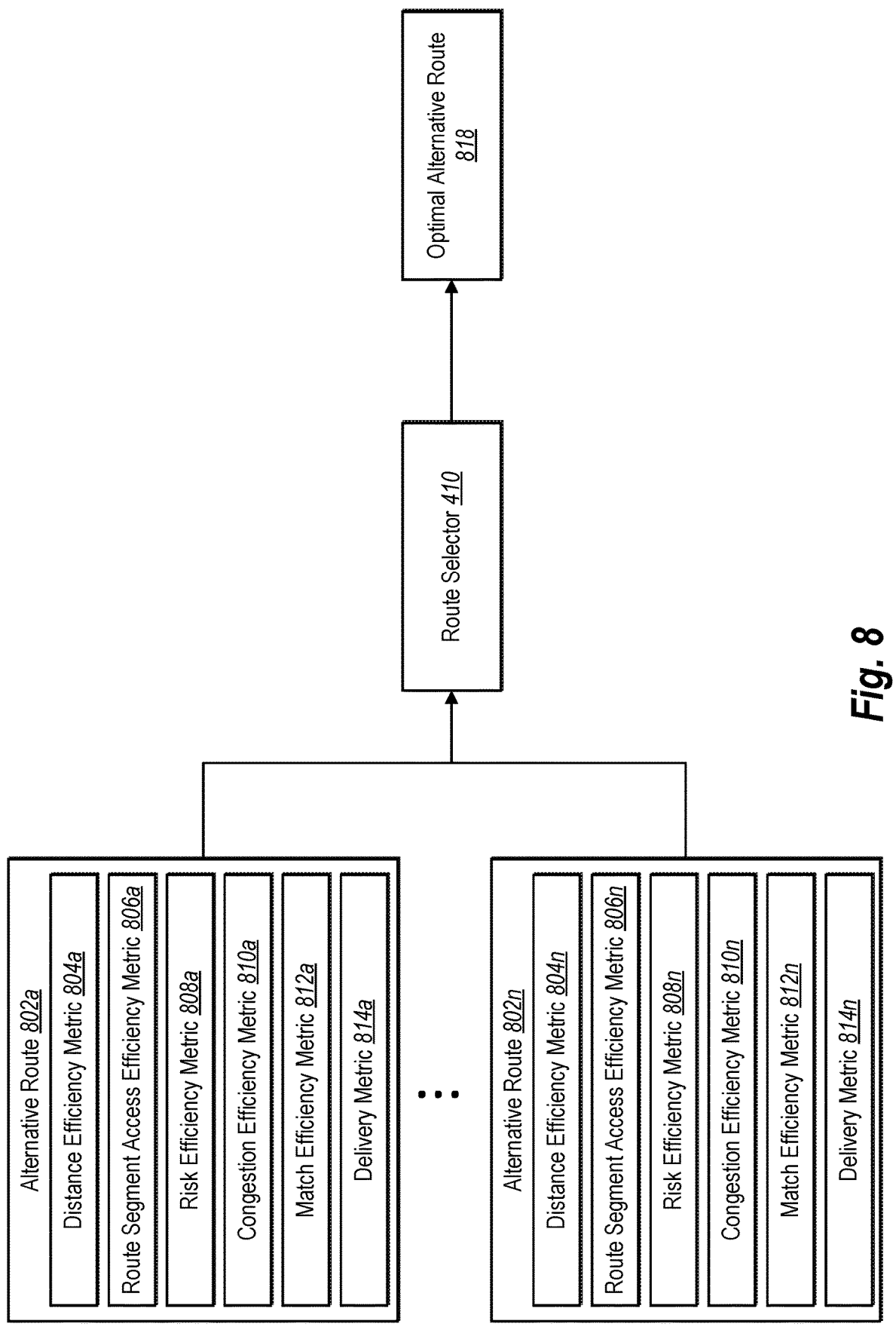
FIG. 8 illustrates an overview of the navigation routing system applying a route selector to determine route efficiency metrics associated with a subset of alternative routes and rank an optimal alternative route in accordance with one or more embodiments.

FIG. 8 illustrates an overview of the navigation routing system 106 applying the route selector 410 to metrics associated with alternative routes 802a-802n in order to identify an optimal alternative route 818 as the top-ranked alternative route from a subset of alternative routes. In one or more embodiments, the route selector 410 can identify the optimal alternative route 818 based on one or more of the metrics 804a, 804n-814a, 814n. For example, the route selector 410 can identify the optimal alternative route 818 as one of the alternative routes 802a-802n with the highest distance efficiency metric 804a, 804n.

Additionally or alternatively, the route selector 410 can identify the optimal alternative route 818 based on one or more combinations of the metrics 804a, 804n-814a, 814n. For example, in one embodiment, the route selector 410 can identify the optimal alternative route 818 as one of the alternative routes 802a-802n with a lowest sum of the distance efficiency metric 804a, 804n and the route-segment access efficiency metric 806a, 806n. In another embodiment, the route selector 410 can identify the optimal alternative route 818 as one of the alternative routes 802a-802n with a lowest sum of the distance efficiency metric 804a, 804n, the route-segment access efficiency metric 806a, 806n, and the risk efficiency metric 808a, 808n.

In yet another embodiment, the route selector 410 can identify the optimal alternative route 818 as one of the alternative routes 802a-802n with the lowest distance efficiency metric 804a, 804n and the congestion efficiency metric 810a, 810n. In another embodiment, the route selector 410 can identify the optimal alternative route 818 as one of the alternative routes 802a-802n with the lowest distance efficiency metric 804a, 804n, and the highest matched-transportation metric 812a, 812n. In yet another embodiment, the route selector 410 can identify the optimal alternative route 818 as one of the alternative routes 802a-802n with the lowest distance efficiency metric 804a, 804n and a highest sum of the matched-transportation metric 812a, 812n and the delivery metric 814a, 814n.

In one or more embodiments, the route selector 410 is an objective function optimized by the navigation routing system 106. For example, the route selector 410 can determine the optimal alternative route 818 by selecting one of the alternative routes 802a, 802b that minimizes an overall route efficiency metric (e.g. an overall cost).

While the route selector 410 can determine the optimal alternative route 818 based on non-temporal factors alone, in at least one embodiment, the route selector 410 additionally determines the optimal alternative route 818 based on temporal factors. For example, the route selector 410 can determine a time efficiency metric associated with each of the alternative routes 802a, 802n. In one or more embodiments, the time efficiency metric may be a static or dynamic time efficiency weight (e.g., rate or cost) associated with the provider 114a multiplied by the travel time for the alternative route. To illustrate, the provider 114a may be associated with a rate per time such as twenty-five cents per minute. Additionally, the route selector 410 can determine that the alternative route 802a is associated with a travel time of five minutes. Accordingly, the route selector 410 can determine the time efficiency metric for the alternative route 802a as twenty-five cents multiplied by five minutes (e.g., $1.25).

In one or more embodiments, the route selector 410 utilizes the time efficiency metric for a given alternative route in connection with other metrics associated with that alternative route. For example, in at least one embodiment, the route selector 410 can determine a route efficiency metric associated with the alternative route 802a based on the distance efficiency metric 804a and the time efficiency metric according to the following equation:

$$C_{route} = D_m \times C_m + T_{sec} \times C_{sec}$$

Where $C_{route}$ is the route efficiency metric associated with the alternative route, $D_m$ is the alternative route distance, $C_m$ is the distance efficiency weight associated with the alternative route, $T_{sec}$ is the alternative route travel time, and $C_{sec}$ is the time efficiency weight associated with the provider 114a. Thus, $D_m \times C_m$ is the distance efficiency metric 804a and $T_{sec} \times C_{sec}$ is the time efficiency metric.

The route selector 410 can determine a route efficiency metric associated with the alternative route by combining the time efficiency weight with other metrics associated with the alternative route. For example, the route selector 410 can determine a route efficiency metric associated with the alternative route 802a based on the route segment access efficiency metric 806a, the distance efficiency metric 804a, and the time efficiency metric according to the following equation:

$$C_{route} = D_m \times C_m + T_{sec} \times C_{sec} + C_{tolls}$$

Where $C_{route}$ is the route efficiency metric associated with the alternative route, $D_m$ is the alternative route distance, $C_m$ is the distance efficiency weight associated with the alternative route, $T_{sec}$ is the alternative route travel time, $C_{sec}$ is the time efficiency weight associated with the provider 114a, and $C_{tolls}$ is the route segment access efficiency metric associated with the alternative route (e.g., sum of all tolls along the alternative route). Thus, $C_{tolls}$ is the route segment access efficiency metric 806a, $D_m \times C_m$ is the distance efficiency metric, and $T_{sec} \times C_{sec}$ is the time efficiency metric.

Additionally, the route selector 410 can determine a route efficiency metric associated with the alternative route by combining the time efficiency metric with the risk efficiency metric 808a, distance efficiency metric 804a, and the time efficiency metric according to the following equation:

$$C_{route} = D_m \times C_m + T_{sec} \times C_{sec} + \mathbb{E}$$

Where $C_{route}$ is the route efficiency metric associated with the alternative route, $D_m$ is the alternative route distance, $C_m$ is the distance efficiency weight associated with the alternative route, $T_{sec}$ is the alternative route travel time, $C_{sec}$ is the time efficiency weight associated with the provider 114a, and $\mathbb{E}$ is a risk efficiency metric associated with the alternative route (e.g., an insurance cost associated with the provider 114a along the alternative route). Thus, $\mathbb{E}$ is the risk efficiency metric 808a, $D_m \times C_m$ is the distance efficiency metric, and $T_{sec} \times C_{sec}$ is the time efficiency metric. In at least one embodiment, the route selector 410 can determine the route efficiency metric for the alternative route 802a by combining the time efficiency metric with the distance efficiency metric 804a, the risk efficiency metric 808a, and the route segment access efficiency metric 806a according to the following equation:

$$C_{route} = D_m \times C_m + T_{sec} \times C_{sec} + C_{tolls} + \mathbb{E}$$

In response to the route selector 410 determining the optimal alternative route 818, the navigation routing system 106 generates navigation instructions associated with the optimal alternative route 818. For example, the navigation routing system 106 can generate navigation instructions including, but not limited to, a list of street and/or turns included in the optimal alternative route 818, and a map overlay. In at least one embodiment, the navigation routing system 106 can cause the provider client device arriving at the pickup location to display the generated navigation instructions associated with the optimal alternative route 818.

Figure 9:
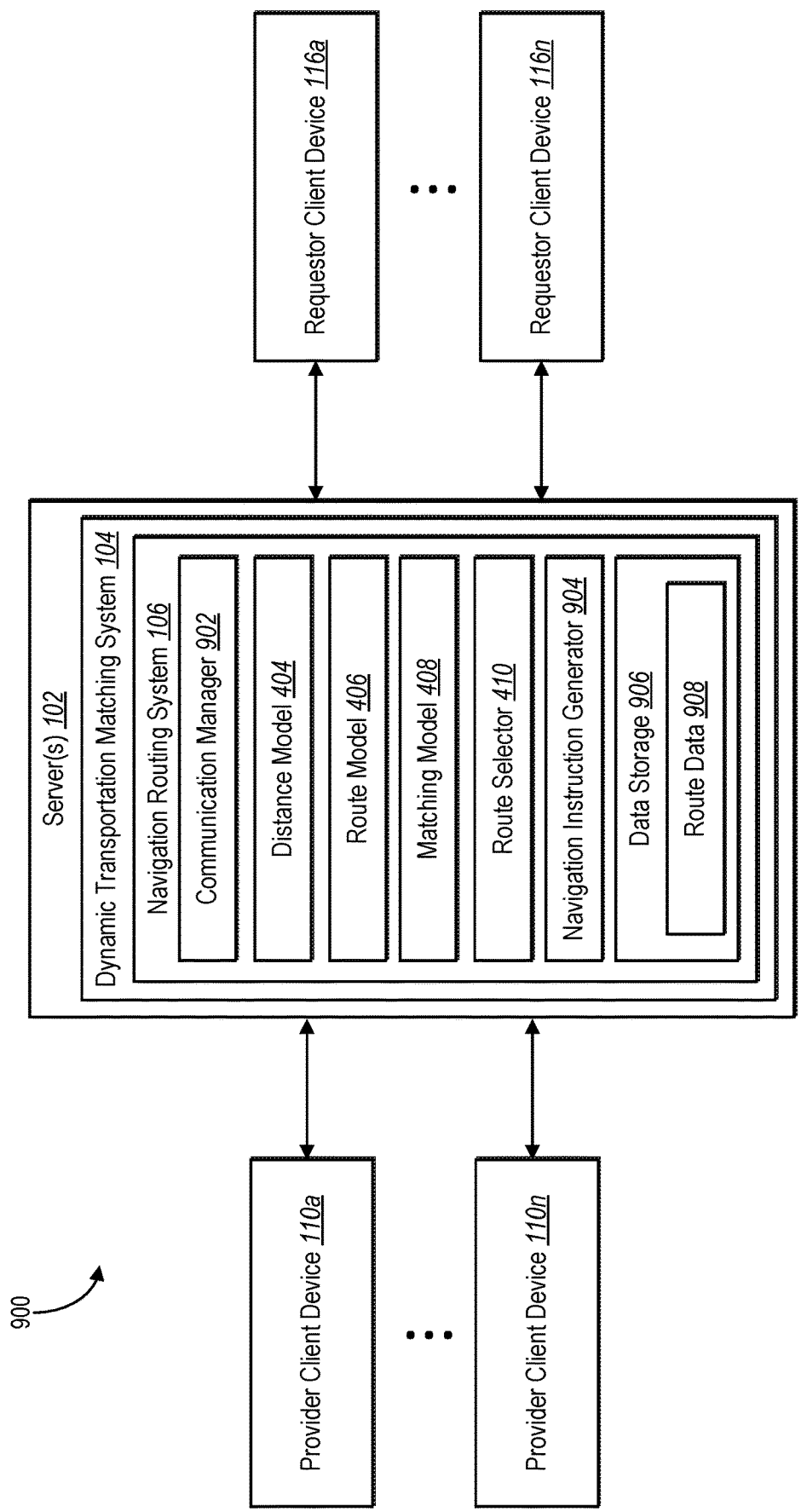
FIG. 9 illustrates a schematic diagram of the navigation routing system in accordance with one or more embodiments.

Turning now to FIG. 9, additional detail is provided regarding a system 900, including components and capabilities of the navigation routing system 106 in accordance with one or more embodiments. As shown, the navigation routing system 106 is implemented by the server(s) 102, including the dynamic transportation matching system 104. In some embodiments, the components of the navigation routing system 106 can be implemented by a single device (e.g., the server(s) 102, and/or the provider client devices 110a-110n) or multiple devices. As shown, the navigation routing system 106 includes a communication manager 902, the distance model 404, the route model 406, the matching model 408, the route selector 410, a navigation instruction generator 904, and a data storage 906 including route data 908. Each is discussed in turn below.

As just mentioned, and as shown in FIG. 9, the navigation routing system 106 includes the communication manager 902. In one or more embodiments, the communication manager 902 handles all communications between the navigation routing system 106, the requestor client devices 116a-116n, and the provider client devices 110a-110n. For example, the communication manager 902 receives signals from the provider client devices 110a-110n and the requestor client devices 116a-116n. The communication manager 902 further provides generated navigation instructions to the provider client devices 110a-110n. Additionally, the communication manager 902 can also handle communications between the navigation routing system 106 and other third-party systems (e.g., routing systems, traffic detection systems, weather forecast systems).

As mentioned above, and as shown in FIG. 9, the navigation routing system 106 includes the distance model 404.

As discussed above, the navigation routing system 106 applies the distance model 404 to distance-based factors associated with an alternative route to determine a distance efficiency metric associated with the alternative route. Accordingly, the distance model 404 can include one or more algorithms, rules, heuristics, knowledge graphs, and/or models that determine the distance efficiency metric associated with the alternative route.

As mentioned above, and as shown in FIG. 9, the navigation routing system 106 includes the route model 406. As discussed above, the navigation routing system 106 applies the route model 406 to route-based factors associated with an alternative route to determine one or more of a route-segment access efficiency metric, a risk efficiency metric, and a congestion efficiency metric associated with the alternative route. Accordingly, the route model 406 can include one or more algorithms, rules, heuristics, knowledge graphs, and/or models that determine one or more of a route-segment access efficiency metric, a risk efficiency metric, and a congestion efficiency metric associated with the alternative route. For example, the route model 406 can apply a congestion model (e.g., the congestion model 618 shown in FIG. 6B) to various route-based factors to determine a congestion efficiency metric associated with the alternative route.

As mentioned above, and as shown in FIG. 9, the navigation routing system 106 includes the matching model 408. As discussed above, the navigation routing system 106 applies the matching model 408 to match-based factors associated with an alternative route to determine a match efficiency metric (e.g., one or more of a matched-transportation metric and a delivery metric) associated with the alternative route. Accordingly, the matching model 408 can include one or more algorithms, rules, heuristics, knowledge graphs, and/or models that determine one or more of a matched-transportation metric and a delivery metric associated with the alternative route. For example, the matching model 408 can apply a historical data model and/or a match prediction model (e.g., the historical data model 712 and/or the match prediction model 714 shown in FIG. 7B) to match-based factors associated with the alternative route to determine a match efficiency metric associated with the alternative route.

As mentioned above, and as shown in FIG. 9, the navigation routing system 106 includes the route selector 410. As discussed above, the navigation routing system 106 applies the route selector 410 to metrics associated with a subset of alternative routes in order to identify one or more optimal alternative routes from the subset of alternative routes. For example, the route selector 410 can identify an optimal alternative route by minimizing one or more metrics and/or maximizing other metrics associated with each of the subset of alternative routes. For instance, in at least one embodiment, the route selector 410 ranks the subset of alternative routes based on minimizing and/or maximizing any of the metrics discussed herein, and selects the top-ranked alternative route as the optimal alternative route.

As mentioned above, and as shown in FIG. 9, the navigation routing system 106 includes the navigation instruction generator 904. In one or more embodiments, the navigation instruction generator 904 generates navigation instructions associated with an optimal alternative route determined by the route selector 410. The navigation instruction generator 904 can further provide the generated navigation instructions to a provider client device 110*a*-110*n* so as to cause the provider client device 110*a*-110*n* to display the navigation instructions.

The navigation routing system 106 also includes the data storage 906. In one or more embodiments, the data storage 906 includes the route data 908. For example, the route data 908 can include historical transportation information associated with routes across one or more geographical areas, such as described herein.

Each of the components of the system 900 can include software, hardware, or both. For example, the components of the system 900 can include one or more instructions stored on a computer-readable storage medium and executable by processors of one or more computing devices, such as a client device or a server device. When executed by the one or more processors, the computer-executable instructions of the navigation routing system 106 can cause the computing device(s) (e.g., the server(s) 102) to perform the methods described herein. Alternatively, the components of the system 900 can include hardware, such as a special-purpose processing device to perform a certain function or group of functions. Alternatively, the components of the system 900 can include a combination of computer-executable instructions and hardware.

Furthermore, the components of the system 900 may, for example, be implemented as one or more operating systems, as one or more stand-alone applications, as one or more modules of an application, as one or more plug-ins, as one or more library functions or functions that may be called by other applications, and/or as a cloud-computing model. Thus, the components of the system 900 may be implemented as a stand-alone application, such as a desktop or mobile application. Furthermore, the components of the system 900 may be implemented as one or more web-based applications hosted on a remote server.

Figure 10:
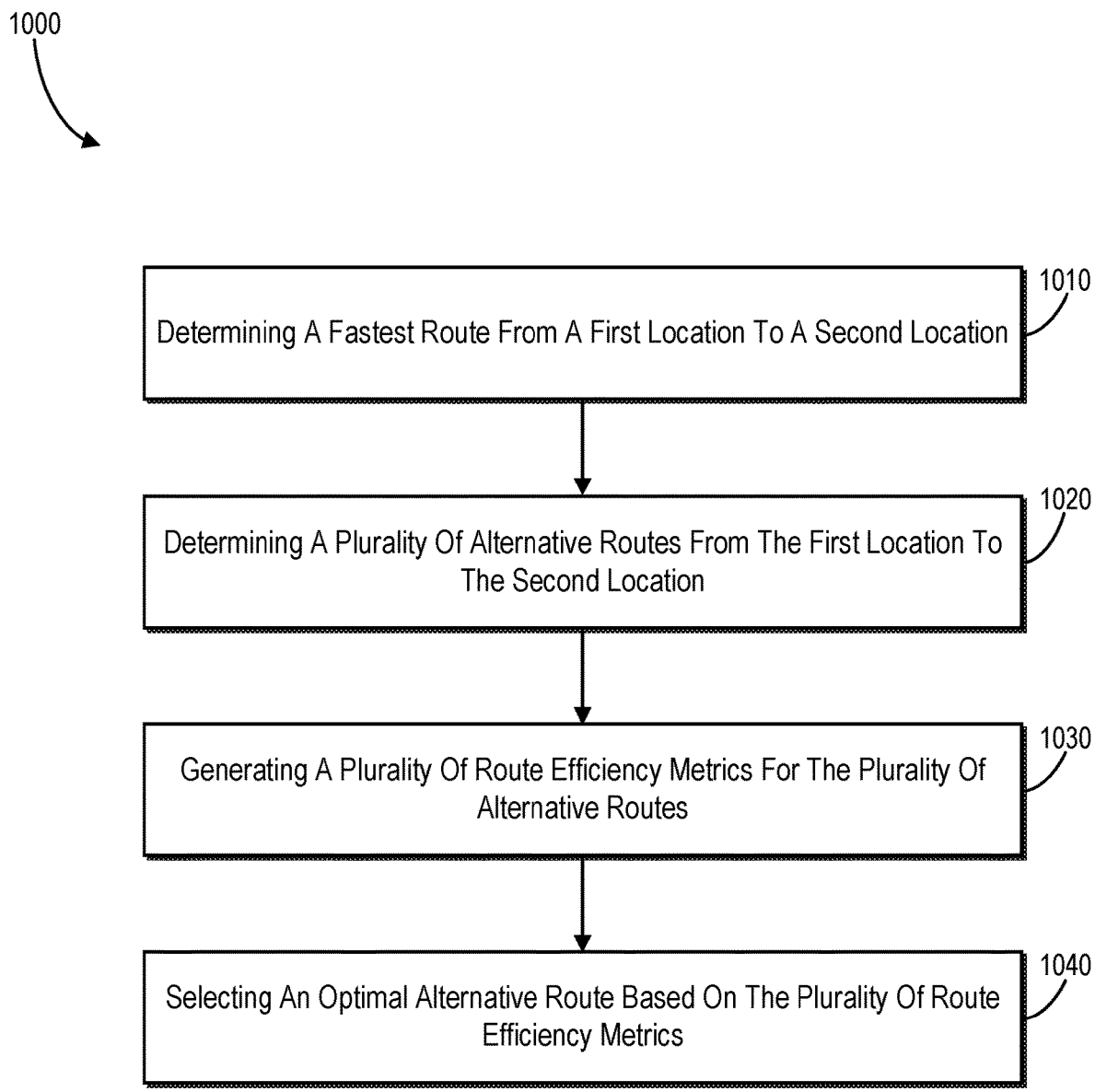
FIG. 10 illustrates a flowchart of a series of acts in a method of determining an optimal alternative route determined based on non-temporal factors in accordance with one or more embodiments.

FIGS. 1-9, the corresponding text, and the examples provide several different systems, methods, techniques, components, and/or devices of the navigation routing system 106 in accordance with one or more embodiments. In addition to the above description, FIG. 10 illustrates a flowchart of a series of acts 1000 in a method of determining an optimal alternative route determined based on non-temporal factors in accordance with one or more embodiments. The navigation routing system 106 may perform one or more acts of the series of acts 1000 in addition to or alternatively to one or more acts described in conjunction with other figures. While FIG. 10 illustrates acts according to a respective embodiment, alternative embodiments may omit, add to, reorder, and/or modify any of the acts shown in FIG. 10. The acts of FIG. 10 can be performed as part of a method. Alternatively, a non-transitory computer-readable medium can comprise instructions that, when executed by one or more processors, cause a computing device to perform the acts of FIG. 10. In some embodiments, a system can perform the acts of FIG. 10.

As shown in FIG. 10, the series of acts 1000 includes an act 1010 of determining a fastest route from a first location to a second location. In particular, the act 1010 can involve determining a fastest route from a first location to a second location specified by a transportation match.

As shown in FIG. 10, the series of acts 1000 includes an act 1020 of determining a plurality of alternative routes from the first location to the second location. In particular, the act 1020 can involve determining a plurality of alternative routes from the first location to the second location that are within a travel-time threshold of the fastest route.

As shown in FIG. 10, the series of acts 1000 includes an act 1030 of generating a plurality of route efficiency metrics for the plurality of alternative routes. In particular, the act 1030 can involve generating a plurality of route efficiency metrics corresponding to the plurality of alternative routes by, for a first alternative route, combining a temporal factor and a plurality of non-temporal factors to generate a first route efficiency metric. For example, generating the first route efficiency metric for the first alternative route can include: combining a time associated with the first alternative route with a time efficiency weight to generate the temporal factor; and generating the plurality of non-temporal factors by generating at least one of: a distance efficiency metric combining a distance associated with the first alternative route with a distance efficiency weight; or a route-segment access efficiency metric reflecting an efficiency penalty for accessing a route segment of the first alternative route.

In one or more embodiments, the series of acts 1000 includes determining the plurality of non-temporal factors by: determining a measure of congestion corresponding to the first alternative route; and converting the measure of congestion to a congestion efficiency metric utilizing a congestion efficiency weight. Additionally or alternatively, the series of acts 1000 includes determining the plurality of non-temporal factors by determining a risk efficiency metric reflecting a likelihood of provider vehicle interruption events corresponding to the first alternative route. For example, the series of acts 1000 can include determining the risk efficiency metric by: identifying a plurality of navigational maneuvers corresponding to the first alternative route; determining risk efficiency measures corresponding to the plurality of navigational maneuvers; and combining the risk efficiency measures to determine the risk efficiency metric for the first alternative route.

Additionally or alternatively, the series of acts 1000 includes determining the plurality of non-temporal factors by determining a match-based efficiency metric reflecting a likelihood of identifying an additional transportation match along the first alternative route. For example, the series of acts 1000 can include determining the match-based efficiency metric by utilizing a prediction model to generate a transportation match prediction for a route segment of the first alternative route from historical transportation matches corresponding to the route segment. Additionally or alternatively, the series of acts 1000 can include determining the match-based efficiency metric by determining a likelihood of a delivery transportation match along the first alternative route.

As shown in FIG. 10, the series of acts 1000 includes an act 1040 of selecting an optimal alternative route based on the plurality of route efficiency metrics. In particular, the act 1040 can involve selecting an optimal alternative route to provide to a provider client device by comparing the plurality of route efficiency metrics corresponding to the plurality of alternative routes.

In one or more embodiments, the series of acts 1000 includes an act of, in response to determining that a location of the provider client device does not correspond with the optimal alternative route: determining another fastest route from the location of the provider client device to the second location; identifying a second plurality of alternative routes from the location of the provider client device to the second location; determining, based on the plurality of non-temporal factors, an additional optimal alternative route from the second plurality of alternative routes; and providing the additional optimal alternative route for display to the provider client device or causing the provider client device to display the additional optimal alternative route.

Figure 11:
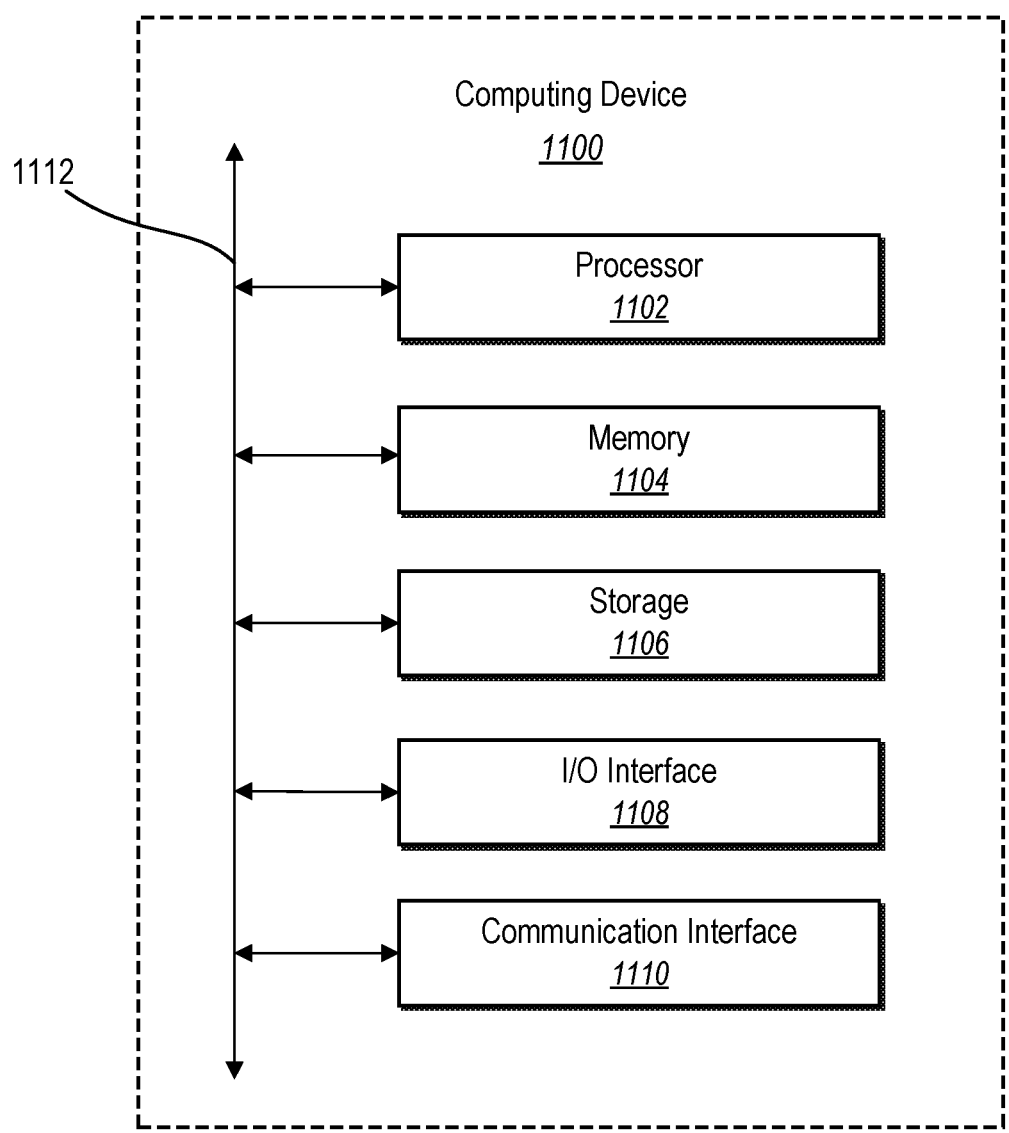
FIG. 11 illustrates a block diagram of an example computing device in accordance with one or more embodiments.

FIG. 11 illustrates a block diagram of an example computing device 1100 that may be configured to perform one or more of the processes described above. One will appreciate that one or more computing devices, such as the computing device 1100 may represent the computing devices described above (e.g., the computing system 700, the server(s) 102, the requestor client devices 116a-116n, the provider client devices 110a-110n). In one or more embodiments, the computing device 1100 may be a mobile device (e.g., a mobile telephone, a smartphone, a PDA, a tablet, a laptop, a camera, a tracker, a watch, a wearable device, etc.). In some embodiments, the computing device 1100 may be a non-mobile device (e.g., a desktop computer or another type of client device). Further, the computing device 1100 may be a server device that includes cloud-based processing and storage capabilities.

As shown in FIG. 11, the computing device 1100 can include one or more processor(s) 1102, memory 1104, a storage device 1106, input/output interfaces 1108 (or "I/O interfaces 1108"), and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other embodiments. Furthermore, in certain embodiments, the computing device 1100 includes fewer components than those shown in FIG. 11. Components of the computing device 1100 shown in FIG. 11 will now be described in additional detail.

In particular embodiments, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, the storage device 1106 can include a non-transitory storage medium described above. The storage device 1106 may include a hard disk drive (HDD), flash memory, a Universal Serial Bus (USB) drive or a combination these or other storage devices.

As shown, the computing device 1100 includes one or more I/O interfaces 1108, which are provided to allow a user to provide input to (such as user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of such I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can include hardware, software, or both that connects components of the computing device 1100 to each other.

Figure 12:
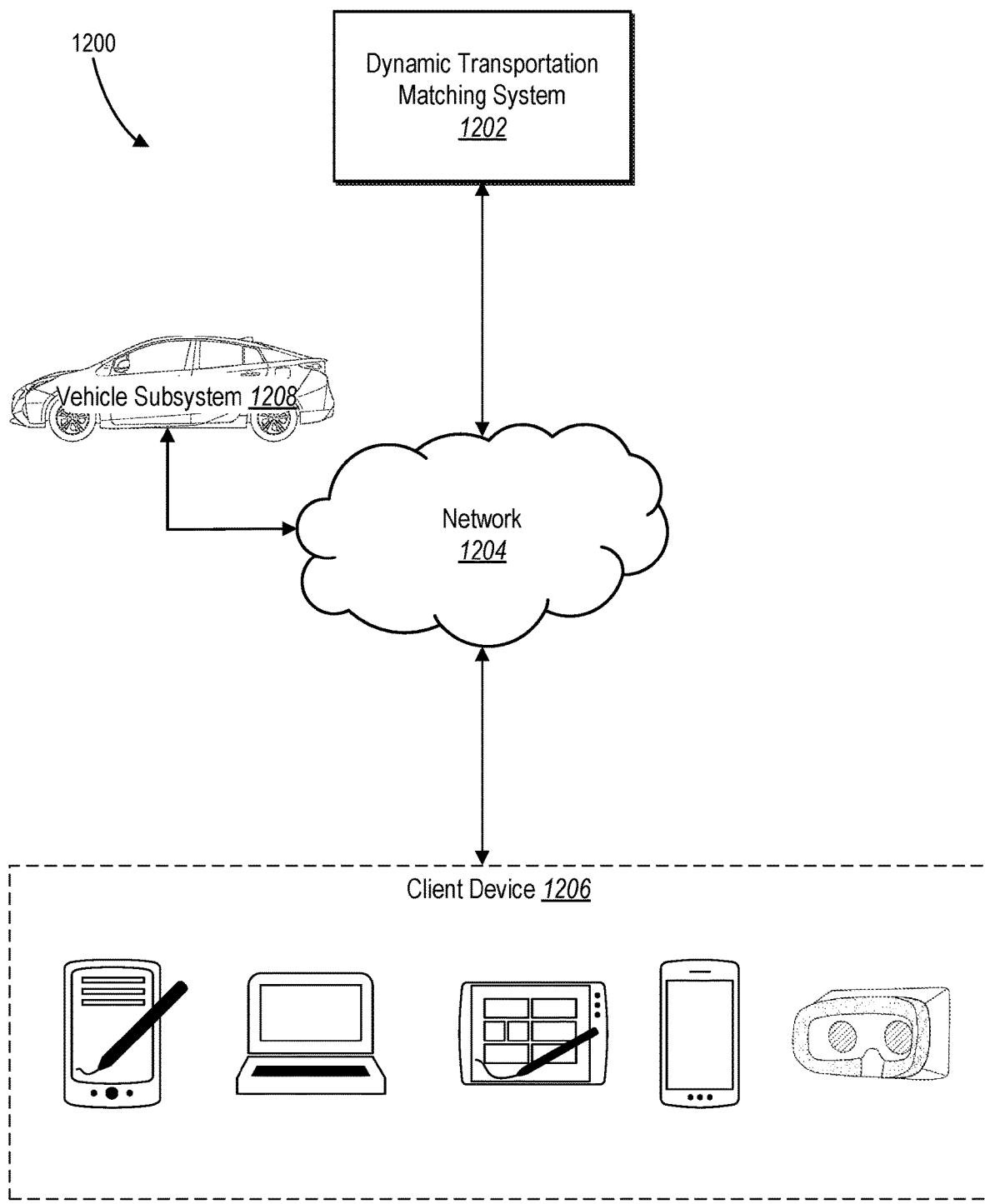
FIG. 12 illustrates an example network environment of a dynamic transportation matching system in accordance with one or more embodiments.

FIG. 12 illustrates an example network environment 1200 of a dynamic transportation matching system (e.g., the dynamic transportation matching system 124). The network environment 1200 includes a client device 1206, a dynamic transportation matching system 1202, and a vehicle subsystem 1208 connected to each other by a network 1204. Although FIG. 12 illustrates a particular arrangement of the client device 1206, the dynamic transportation matching system 1202, the vehicle subsystem 1208, and the network 1204, this disclosure contemplates any suitable arrangement of the client device 1206, the dynamic transportation matching system 1202, the vehicle subsystem 1208, and the network 1204. As an example, and not by way of limitation, two or more of the client devices 1206, the dynamic transportation matching system 1202, and the vehicle subsystem 1208 communicate directly, bypassing the network 1204. As another example, two or more of the client devices 1206, the dynamic transportation matching system 1202, and the vehicle subsystem 1208 may be physically or logically co-located with each other in whole or in part. Moreover, although FIG. 12 illustrates a particular number of the client devices 1206, the dynamic transportation matching systems 1202, the vehicle subsystems 1208, and the networks 1204, this disclosure contemplates any suitable number of the client devices 1206, the dynamic transportation matching systems 1202, the vehicle subsystems 1208, and the networks 1204. As an example, and not by way of limitation, the network environment 1200 may include multiple client devices 1206, the dynamic transportation matching systems 1202, the vehicle subsystems 1208, and the networks 1204.

This disclosure contemplates any suitable network 1204. As an example, and not by way of limitation, one or more portions of the network 1204 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 1204 may include one or more networks 1204.

Links may connect the client device 1206, the dynamic transportation matching system 1202, and the vehicle subsystem 1208 to the communication network 1204 or to each other. This disclosure contemplates any suitable links. In particular embodiments, one or more links include one or more wireline (such as for example Digital Subscriber Line (DSL) or Data Over Cable Service Interface Specification (DOCSIS), wireless (such as for example Wi-Fi or Worldwide Interoperability for Microwave Access (WiMAX), or optical (such as for example Synchronous Optical Network (SONET) or Synchronous Digital Hierarchy (SDH) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout the network environment 1200. One or more first links may differ in one or more respects from one or more second links.

In particular embodiments, the client device 1206 may be an electronic device including hardware, software, or embedded logic components or a combination of two or more such components and capable of carrying out the appropriate functionalities implemented or supported by the client device 1206. As an example, and not by way of limitation, a client device 1206 may include any of the computing devices discussed above in relation to FIG. 12. A client device 1206 may enable a network user at the client device 1206 to access a network. A client device 1206 may enable its user to communicate with other users at other client devices 1206.

In particular embodiments, the client device 1206 may include a transportation service application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 1206 may enter a Uniform Resource Locator (URL) or other address directing the web browser to a particular server (such as server), and the web browser may generate a Hyper Text Transfer Protocol (HTTP) request and communicate the HTTP request to server. The server may accept the HTTP request and communicate to client device 1206 one or more Hyper Text Markup Language (HTML) files responsive to the HTTP request. The client device 1206 may render a webpage based on the HTML files from the server for presentation to the user. This disclosure contemplates any suitable webpage files. As an example, and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the dynamic transportation matching system 1202 may be a network-addressable computing system that can host a ride share transportation network. The dynamic transportation matching system 1202 may generate, store, receive, and send data, such as, for example, user-profile data, concept-profile data, text data, ride request data, GPS location data, provider data, requestor data, vehicle data, or other suitable data related to the ride share transportation network. This may include authenticating the identity of providers and/or vehicles who are authorized to provide ride services through the dynamic transportation matching system 1202. In addition, the transportation service system may manage identities of service requestors such as users/requestors. In particular, the transportation service system may maintain requestor data such as driving/riding histories, personal data, or other user data in addition to navigation and/or traffic management services or other location services (e.g., GPS services).

In particular embodiments, the dynamic transportation matching system 1202 may manage ride matching services to connect a user/requestor with a vehicle and/or provider. By managing the ride matching services, the dynamic transportation matching system 1202 can manage the distribution and allocation of vehicle subsystem resources and user resources such as GPS location and availability indicators, as described herein.

The dynamic transportation matching system 1202 may be accessed by the other components of the network environment 1200 either directly or via network 1204. In particular embodiments, the dynamic transportation matching system 1202 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the dynamic transportation matching system 1202 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1206, or a dynamic transportation matching system 1202 to manage, retrieve, modify, add, or delete, the information stored in data store.

In particular embodiments, the dynamic transportation matching system 1202 may provide users with the ability to take actions on various types of items or objects, supported by the dynamic transportation matching system 1202. As an example, and not by way of limitation, the items and objects may include ride share networks to which users of the dynamic transportation matching system 1202 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in the dynamic transportation matching system 1202 or by an external system of a third-party system, which is separate from the dynamic transportation matching system 1202 and coupled to the dynamic transportation matching system 1202 via a network 1204.

In particular embodiments, the dynamic transportation matching system 1202 may be capable of linking a variety of entities. As an example, and not by way of limitation, the dynamic transportation matching system 1202 may enable users to interact with each other or other entities, or to allow users to interact with these entities through an application programming interfaces (API) or other communication channels.

In particular embodiments, the dynamic transportation matching system 1202 may include a variety of servers, sub-systems, programs, modules, logs, and data stores. In particular embodiments, the dynamic transportation matching system 1202 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The dynamic transportation matching system 1202 may also include suitable components such as network interfaces, security mechanisms, load balancers, failover servers, management-and-network-operations consoles, other suitable components, or any suitable combination thereof. In particular embodiments, the dynamic transportation matching system 1202 may include one or more user-profile stores for storing user profiles. A user profile may include, for example, biographic information, demographic information, behavioral information, social information, or other types of descriptive information, such as work experience, educational history, hobbies or preferences, interests, affinities, or location.

The web server may include a mail server or other messaging functionality for receiving and routing messages between the dynamic transportation matching system 1202 and one or more client devices 1206. An action logger may be used to receive communications from a web server about a user's actions on or off the dynamic transportation matching system 1202. In conjunction with the action log, a third-party-content-object log may be maintained of user exposures to third-party-content objects. A notification controller may provide information regarding content objects to a client device 1206. Information may be pushed to a client device 1206 as notifications, or information may be pulled from the client device 1206 responsive to a request received from the client device 1206. Authorization servers may be used to enforce one or more privacy settings of the users of the dynamic transportation matching system 1202. A privacy setting of a user determines how particular information associated with a user can be shared. The authorization server may allow users to opt in to or opt out of having their actions logged by the dynamic transportation matching system 1202 or shared with other systems, such as, for example, by setting appropriate privacy settings. Third-party-content-object stores may be used to store content objects received from third parties. Location stores may be used for storing location information received from the client devices 1206 associated with users.

In addition, the vehicle subsystem 1208 can include a human-operated vehicle or an autonomous vehicle. A provider of a human-operated vehicle can perform maneuvers to pick up, transport, and drop off one or more requestors according to the embodiments described herein. In certain embodiments, the vehicle subsystem 1208 can include an autonomous vehicle—i.e., a vehicle that does not require a human operator. In these embodiments, the vehicle subsystem 1208 can perform maneuvers, communicate, and otherwise function without the aid of a human provider, in accordance with available technology.

In particular embodiments, the vehicle subsystem 1208 may include one or more sensors incorporated therein or associated thereto. For example, sensor(s) can be mounted on the top of the vehicle subsystem 1208 or else can be located within the interior of the vehicle subsystem 1208. In certain embodiments, the sensor(s) can be located in multiple areas at once i.e., split up throughout the vehicle subsystem 1208 so that different components of the sensor (s) can be placed in different locations in accordance with optimal operation of the sensor(s). In these embodiments, the sensor(s) can include a LIDAR sensor and an inertial measurement unit (IMU) including one or more accelerometers, one or more gyroscopes, and one or more magnetometers. The sensor suite can additionally or alternatively include a wireless IMU (WIMU), one or more cameras, one or more microphones, or other sensors or data input devices capable of receiving and/or recording information relating to navigating a route to pick up, transport, and/or drop off a requestor.

In particular embodiments, the vehicle subsystem 1208 may include a communication device capable of communicating with the client device 1206 and/or the dynamic transportation matching system 1202. For example, the vehicle subsystem 1208 can include an on-board computing device communicatively linked to the network 1204 to transmit and receive data such as GPS location information, sensor-related information, requestor location information, or other relevant information.

In the foregoing specification, the invention has been described with reference to specific exemplary embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the foregoing specification, the invention has been described with reference to specific exemplary embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
    generating, by at least one processor, a fastest route from a first location to a second location specified by a transportation match;
    providing, for display via a user interface of a provider client device, the fastest route between the first location and the second location for the transportation match;
    generating, by the at least one processor, a plurality of alternative routes from the first location to the second location that are within a travel-time threshold of the fastest route;
    generating, by the at least one processor, a plurality of combined route efficiency metrics corresponding to the plurality of alternative routes by:
        generating a first temporal factor and a second temporal factor by predicting an amount of time associated with a first alternative route and a second alternative route;
        generating a first plurality of non-temporal factors for the first alternative route and a second plurality of non-temporal factors for the second alternative route, the first plurality of non-temporal factors comprising a first match-based efficiency metric, a first distance efficiency metric, and a first set of route efficiency metrics, and the second plurality of non-temporal factors comprising a second match-based efficiency metric, a second distance efficiency metric, and a second set of route efficiency metrics by:
            generating, utilizing a matching model comprising a machine learning model iteratively trained to generate match predictions for route segments, a first transportation match prediction for a first route segment of the first alternative route from historical transportation matches corresponding to the first route segment;
            generating, utilizing the matching model comprising a machine learning model iteratively trained to generate match predictions for route segments, a second transportation match prediction for a second route segment of the second alternative route from historical transportation matches corresponding to the second route segment;
            generating the first match-based efficiency metric from the first transportation match prediction and the second match-based efficiency metric from the second transportation match prediction;
            generating, utilizing a distance model, the first distance efficiency metric from a first set of map and positioning data corresponding to the first alternative route;
            generating, utilizing the distance model, the second distance efficiency metric from a second set of map and positioning data corresponding to the second alternative route;
            generating, utilizing a route model, the first set of route efficiency metrics corresponding to the first alternative route; and
            generating, utilizing the route model, the second set of route efficiency metrics corresponding to the second alternative route;

combining the first temporal factor and the first plurality of non-temporal factors to generate a first combined route efficiency metric for the first alternative route; and combining the second temporal factor and the second plurality of non-temporal factors to generate a second combined route efficiency metric for the second alternative route;

selecting, by the at least one processor, a first optimal alternative route from the plurality of alternative routes by comparing the plurality of combined route efficiency metrics corresponding to the plurality of alternative routes;

selecting, by the at least one processor, a second optimal alternative route from the plurality of alternative routes by comparing the plurality of combined route efficiency metrics corresponding to the plurality of alternative routes;

providing, for display via an updated user interface of the provider client device, the first and the second optimal alternative routes for selection by a provider client device input; and providing, for display via an updated user interface of the provider client device, a selected optimal alternative route from the first optimal alternative route or the second optimal alternative route, causing the provider client device to navigate along the selected optimal alternative route between the first location and the second location.

2. The computer-implemented method as recited in claim 1, further comprising generating the first combined route efficiency metric for the first alternative route and the second combined route efficiency metric for the second alternative route by combining the time associated with the first alternative route and the time associated with the second alternative route with time efficiency weights to generate the first temporal factor and the second temporal factor.

3. The computer-implemented method as recited in claim 1, further comprising utilizing the route model to:
generate a first measure of congestion corresponding to the first alternative route and a second measure of congestion corresponding to the second alternative route; and
converting the first measure of congestion to a first congestion efficiency metric utilizing a first congestion efficiency weight and the second measure of congestion to a second congestion efficiency metric utilizing a second congestion efficiency weight.

4. The computer-implemented method as recited in claim 1, further comprising utilizing the route model to generate a first risk efficiency metric reflecting a first likelihood of provider vehicle interruption events corresponding to the first alternative route and a second risk efficiency metric reflecting a second likelihood of provider vehicle interruption events corresponding to the second alternative route.

5. The computer-implemented method as recited in claim 4, further comprising generating the first risk efficiency metric and the second risk efficiency metric by:
identifying a first plurality of navigational maneuvers corresponding to the first alternative route and a second plurality of navigational maneuvers corresponding to the second alternative route;
determining a first set of risk efficiency measures corresponding to the first plurality of navigational maneuvers and a second set of risk efficiency measures corresponding to the second plurality of navigational maneuvers;

combining the first set of risk efficiency measures to determine the first risk efficiency metric for the first alternative route; and combining the second set of risk efficiency measures to determine the second risk efficiency metric for the second alternative route.

6. The computer-implemented method as recited in claim 1, further comprising generating the first transportation match prediction and the second transportation match prediction by generating, utilizing the matching model, a first likelihood of identifying an additional transportation match along the first alternative route and a second likelihood of identifying an additional transportation match along the second alternative route.

7. The computer-implemented method as recited in claim 6, further comprising determining the first match-based efficiency metric and the second match-based efficiency metric by generating, utilizing the matching model, a first delivery transportation match prediction for the first route segment of the first alternative route and a second delivery transportation match prediction for the second route segment of the second alternative route.

8. The computer-implemented method as recited in claim 7, further comprising generating the first delivery transportation match prediction and the second delivery transportation match prediction by generating, utilizing the matching model, a first likelihood of a delivery transportation match along the first alternative route and a second likelihood of a delivery transportation match along the second alternative route.

9. The computer-implemented method as recited in claim 1, further comprising in response to determining that a location of the provider client device does not correspond with the selected optimal alternative route:
determining another fastest route from the location of the provider client device to the second location;
identifying a second plurality of alternative routes from the location of the provider client device to the second location;
determining, based on an additional plurality of non-temporal factors, an additional optimal alternative route from the second plurality of alternative routes; and
providing, for display via an additional updated user interface of the provider client device, the additional optimal alternative route, causing the provider client device to navigate along the additional optimal alternative route.

10. A system comprising:
at least one processor; and
a non-transitory computer readable storage medium comprising instructions that, when executed by the at least one processor, cause the system to:
generate a fastest route from a first location to a second location specified by a transportation match;
provide, for display via a user interface of a provider client device, the fastest route between the first location and the second location for the transportation match;
generate a plurality of alternative routes from the first location to the second location that are within a travel-time threshold of the fastest route;
generate a plurality of combined route efficiency metrics corresponding to the plurality of alternative routes by:
generating a first temporal factor and a second temporal factor by predicting an amount of time associated with a first alternative route and a second alternative route;

generating a first plurality of non-temporal factors for the first alternative route and a second plurality of non-temporal factors for the second alternative route, the first plurality of non-temporal factors comprising a first match-based efficiency metric, a first distance efficiency metric, and a first set of route efficiency metrics, and the second plurality of non-temporal factors comprising a second match-based efficiency metric, a second distance efficiency metric, and a second set of route efficiency metrics by:

generating, utilizing a matching model comprising a machine learning model iteratively trained to generate match predictions for route segments, a first transportation match prediction for a first route segment of the first alternative route from historical transportation matches corresponding to the first route segment;

generating, utilizing the matching model comprising a machine learning model iteratively trained to generate match predictions for route segments, a second transportation match prediction for a second route segment of the second alternative route from historical transportation matches corresponding to the second route segment;

generating the first match-based efficiency metric from the first transportation match prediction and the second match-based efficiency metric from the second transportation match prediction;

generating, utilizing a distance model, the first distance efficiency metric from a first set of map and positioning data corresponding to the first alternative route;

generating, utilizing the distance model, the second distance efficiency metric from a second set of map and positioning data corresponding to the second alternative route;

generating, utilizing a route model, the first set of route efficiency metrics corresponding to the first alternative route; and generating, utilizing the route model, the second set of route efficiency metrics corresponding to the second alternative route;

combining the first temporal factor and the first plurality of non-temporal factors to generate a first combined route efficiency metric for the first alternative route; and combining the second temporal factor and the second plurality of non-temporal factors to generate a second combined route efficiency metric for the second alternative route;

select a first optimal alternative route from the plurality of alternative routes by comparing the combined plurality of route efficiency metrics corresponding to the plurality of alternative routes;

select, by the at least one processor, a second optimal alternative route from the plurality of alternative routes by comparing the plurality of combined route efficiency metrics corresponding to the plurality of alternative routes;

provide, for display via an updated user interface of the provider client device, the first and the second optimal alternative routes for selection by a provider client device input; and provide, for display via an updated user interface of the provider client device, a selected optimal alternative route from the first optimal alternative route or the second optimal alternative route, causing the provider client device to navigate along the selected optimal alternative route between the first location and the second location.

11. The system as recited in claim 10, further comprising instructions that, when executed by the at least one processor, cause the system to generate the first combined route efficiency metric for the first alternative route by:

combining the amount of time associated with the first alternative route with a first time efficiency weight to generate the first temporal factor; and generating the first plurality of non-temporal factors by:

generating, utilizing the distance model, the first distance efficiency metric by combining a distance associated with the first alternative route with a distance efficiency weight; and generating, utilizing the route model, the first set of route efficiency metrics reflecting an efficiency penalty for accessing a route segment of the first alternative route.

12. The system as recited in claim 10, further comprising instructions that, when executed by the at least one processor, cause the system to generate the first set of route efficiency metrics by:

utilizing the route model to generate a measure of congestion corresponding to the first alternative route; and converting the measure of congestion to a congestion efficiency metric utilizing a congestion efficiency weight.

13. The system as recited in claim 10, wherein generating the first set of route efficiency metrics further comprises utilizing the route model to generate a risk efficiency metric reflecting a likelihood of provider vehicle interruption events corresponding to the first alternative route.

14. The system as recited in claim 10, further comprising instructions that, when executed by the at least one processor, cause the system to generate the first transportation match prediction and the second transportation match prediction by generating, utilizing the matching model, a likelihood of identifying an additional transportation match along the first alternative route and the second alternative route.

15. The system as recited in claim 10, further comprising instructions that, when executed by the at least one processor, cause the system to, in response to determining that a location of the provider client device does not correspond with the selected optimal alternative route:

determine another fastest route from the location of the provider client device to the second location;

identify a second plurality of alternative routes from the location of the provider client device to the second location;

determine, based on an additional plurality of non-temporal factors, an additional optimal alternative route from the second plurality of alternative routes; and provide, for display via an additional updated user interface of the provider client device, the additional optimal alternative route, causing the provider client device to navigate along the additional optimal alternative route.

16. A non-transitory computer readable storage medium comprising instructions that, when executed by at least one processor, cause a computing device to:
- generate a fastest route from a first location to a second location specified by a transportation match;
- provide, for display via a user interface of a provider client device, the fastest route between the first location and the second location for the transportation match;
- generate a plurality of alternative routes from the first location to the second location that are within a travel-time threshold of the fastest route;
- generate a plurality of combined route efficiency metrics corresponding to the plurality of alternative routes by:
  - generating a first temporal factor and a second temporal factor by predicting an amount of time associated with a first alternative route and a second alternative route;
  - generating a first plurality of non-temporal factors for the first alternative route and a second plurality of non-temporal factors for the second alternative route, the first plurality of non-temporal factors comprising a first match-based efficiency metric, a first distance efficiency metric, and a first set of route efficiency metrics, and the second plurality of non-temporal factors comprising a second match-based efficiency metric, a second distance efficiency metric, and a second set of route efficiency metrics by:
    - generating, utilizing a matching model comprising a machine learning model iteratively trained to generate match predictions for route segments, a first transportation match prediction for a first route segment of the first alternative route from historical transportation matches and corresponding to the first route segment;
    - generating, utilizing the matching model comprising a machine learning model iteratively trained to generate match predictions for route segments, a second transportation match prediction for a second route segment of the second alternative route from historical transportation matches corresponding to the second route segment;
    - generating the first match-based efficiency metric from the first transportation match prediction and the second match-based efficiency metric from the second transportation match prediction;
    - generating, utilizing a distance model, the first distance efficiency metric from a first set of map and positioning data corresponding to the first alternative route;
    - generating, utilizing the distance model, the second distance efficiency metric from a second set of map and positioning data corresponding to the second alternative route;
    - generating, utilizing a route model, the first set of route efficiency metrics corresponding to the first alternative route; and
    - generating, utilizing the route model, the second set of route efficiency metrics corresponding to the second alternative route;
  - combining the first temporal factor and the first plurality of non-temporal factors to generate a first combined route efficiency metric for the first alternative route; and
  - combining the second temporal factor and the second plurality of non-temporal factors to generate a second combined route efficiency metric for the second alternative route;
- select a first optimal alternative route from the plurality of alternative routes by comparing the plurality of combined route efficiency metrics corresponding to the plurality of alternative routes;
- select a second optimal alternative route from the plurality of alternative routes from the plurality of alternative routes by comparing the plurality of combined route efficiency metrics corresponding to the plurality of alternative routes;
- provide, for display via an updated user interface of the provider client device, the first and the second optimal alternative routes for selection by a provider client device input; and
- providing, for display via an updated user interface of the provider client device, a selected optimal alternative route from the first optimal alternative route or the second optimal alternative route, causing the provider client device to navigate along the selected optimal alternative route between the first location and the second location.

17. The non-transitory computer readable storage medium of claim 16, further comprising instructions that, when executed by the at least one processor, cause the computing device to generate the first combined route efficiency metric for the first alternative route and the second combined route efficiency metric for the second alternative route by combining the time associated with the first alternative route and the time associated with the second alternative route with time efficiency weights to generate the first temporal factor and the second temporal factor.

18. The non-transitory computer readable storage medium of claim 17, further comprising instructions that, when executed by the at least one processor, cause the computing device to utilize the route model to generate the first set of route efficiency metrics to reflect a first efficiency penalty for accessing a route segment of the first alternative route and the second set of route efficiency metrics to reflect a second efficiency penalty for accessing a route segment of the second alternative route.

19. The non-transitory computer readable storage medium of claim 18, further comprising instructions that, when executed by the at least one processor, cause the computing device to utilize the route model to generate the first set of route efficiency metrics to reflect a first measure of congestion corresponding to the first alternative route and the second set of route efficiency metrics to reflect a second measure of congestion corresponding to the second alternative route.

20. The non-transitory computer readable storage medium of claim 18, further comprising instructions that, when executed by the at least one processor, cause the computing device to utilize the route model to generate:
- the first set of route efficiency metrics to reflect a first likelihood of provider vehicle interruption events corresponding to the first alternative route and the second set of route efficiency metrics to reflect a second likelihood of provider vehicle interruption events corresponding to the second alternative route.

* * * * *